(12) United States Patent
Chaponniere et al.

(10) Patent No.: US 9,736,641 B2
(45) Date of Patent: Aug. 15, 2017

(54) TECHNIQUES FOR OPTIMIZING HTTP IMPLEMENTATION AS A TRANSPORT PROTOCOL FOR EPC-LEVEL PROXIMITY SERVICES (PROSE) DISCOVERY

(71) Applicant: QUALCOMM Incorporated, San Diego, CA (US)

(72) Inventors: Lenaig Genevieve Chaponniere, San Diego, CA (US); Zhibin Wu, Bedminster, NJ (US); Hong Cheng, Basking Ridge, NJ (US); Haris Zisimopoulos, London (GB)

(73) Assignee: QUALCOMM Incorporated, San Diego, CA (US)

( * ) Notice: Subject to any disclaimer, the term of this patent is extended or adjusted under 35 U.S.C. 154(b) by 22 days.

(21) Appl. No.: 14/849,322

(22) Filed: Sep. 9, 2015

(65) Prior Publication Data

US 2016/0100288 A1 Apr. 7, 2016

Related U.S. Application Data

(60) Provisional application No. 62/059,691, filed on Oct. 3, 2014.

(51) Int. Cl.
*H04W 24/00* (2009.01)
*H04W 4/02* (2009.01)
*H04L 29/08* (2006.01)

(52) U.S. Cl.
CPC ............ *H04W 4/023* (2013.01); *H04L 67/02* (2013.01)

(58) Field of Classification Search
CPC ..... H04W 64/00; H04W 64/003; H04W 4/02; H04W 72/00; H04W 84/18; H04W 88/06; H04W 8/05

USPC .. 455/456.1, 456.2, 456.3, 456.6, 41.2, 41.3
See application file for complete search history.

(56) References Cited

U.S. PATENT DOCUMENTS

| | | | |
|---|---|---|---|
| 2010/0199188 A1 | 8/2010 | Abu-Hakima et al. | |
| 2013/0117226 A1 | 5/2013 | Jain et al. | |
| 2013/0210393 A1 | 8/2013 | Hillier | |
| 2014/0242963 A1* | 8/2014 | Novlan | H04W 48/16 455/418 |

(Continued)

OTHER PUBLICATIONS

International Search Report and Written Opinion—PCT/US2015/049460—ISA/EPO—dated Nov. 26, 2015. (10 pages).

*Primary Examiner* — Temica M Beamer
(74) *Attorney, Agent, or Firm* — Anthony R. Morris

(57) ABSTRACT

Example methods and apparatuses for managing polling in devices implementing proximity services are presented. For instance, an example method of polling management in a ProSe system is presented, which includes receiving, at a network entity, a polling message from a first UE. In addition, the example method may also include receiving, at the network entity and after receiving the polling message, one or both of a first location report associated with the first UE and a second location report associated with a second UE. Furthermore, the example method may include determining whether to generate a polling response message upon receiving one or both of the first location report and the second location report, wherein the polling response message includes a next polling time for the first UE that is based on a location reporting schedule associated with one or both of the first UE and the second UE.

27 Claims, 15 Drawing Sheets

(56) References Cited

U.S. PATENT DOCUMENTS

2014/0248901 A1* 9/2014 Johnsson .............. H04W 64/00
  455/456.1
2014/0328310 A1* 11/2014 Xu ...................... H04W 76/023
  370/329
2016/0278037 A1* 9/2016 Kiss .................... H04L 65/1006

* cited by examiner

TECHNIQUES FOR OPTIMIZING HTTP IMPLEMENTATION AS A TRANSPORT PROTOCOL FOR EPC-LEVEL PROXIMITY SERVICES (PROSE) DISCOVERY

CROSS-REFERENCE TO RELATED APPLICATION

The present Application for patent claims priority to Provisional Application No. 62/059,691 entitled "OPTIMIZING HTTP IMPLEMENTATION AS A TRANSPORT PROTOCOL FOR EPC-LEVEL PROXIMITY SERVICES (PROSE) DISCOVERY" filed Oct. 3, 2014, and assigned to the assignee hereof and hereby expressly incorporated by reference herein.

BACKGROUND

The present disclosure relates generally to communication systems, and more particularly, to apparatus and methods of managing polling in devices implementing proximity services (ProSe).

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

LTE systems support ProSe functionality for user equipment (UE), wherein UEs in proximity may discover each other via an Evolved Packet Core (EPC)-based solution called EPC-level ProSe discovery. The process involves communication procedures between the UE and a network server implementing a ProSe function. The 3GPP stage 3 specification for ProSe (3GPP TS 24.334, Proximity-services (ProSe) User Equipment (UE) to Proximity-services (ProSe) Function Protocol aspects; Stage 3, hereby incorporated by reference in its entirety) mandates the Hypertext Transfer Protocol (HTTP) as transport protocol for these communication procedures.

One of the challenges in using HTTP is to enable server-initiated transactions, such as the Proximity Alert procedure, whereby the network server notifies a polling UE that another UE is in proximity. Because HTTP transactions are, by default, always client-initiated, one of the commonly-used approaches to address this is a "polling" procedure, whereby the client UE frequently transmits a polling message to query the HTTP server to determine if the server has any data for the client UE (e.g., a Proximity Alert). If there is no data for the client UE, the server replies to the polling message with an empty HTTP response.

However, one downside to the above-noted polling procedure is the delivery delay caused by inter-polling intervals, as the server must wait to deliver any data or event indication (e.g., a Proximity Alert) until after the next incoming polling message from the client UE. An enhancement to this approach, called "long polling," allows the server to not immediately respond to the client. Instead, the server that implements "long polling" keeps the HTTP connection open and only responds when the server has data available or after a pre-defined timer expires. The long polling scheme can reduce the delivery latency, but also has several drawbacks. For example, keeping the HTTP connection open blocks any new outgoing HTTP request from the client UE side because the HTTP client is not able to send a new polling message if a prior polling procedure has not completed. Additionally, another drawback is that the ProSe function managed by the HTTP server must maintain an active HTTP connection with each client UE, which adds significant overhead when the number of client UEs increases.

As such, improvements in UE ProSe polling and ProSe function implementation procedures are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various techniques are described in connection with example methods and apparatuses for managing polling in devices implementing proximity services.

For instance, in an aspect of the present disclosure, an example method of polling management in a ProSe system is presented, which includes receiving, at a network entity, a polling message from a first UE. In addition, the example method may also include receiving, at the network entity and after receiving the polling message, one or both of a first location report associated with the first UE and a second location report associated with a second UE. Furthermore, the example method may include determining whether to generate a polling response message upon receiving one or both of the first location report and the second location report, wherein the polling response message includes a next polling time for the first UE that is based on a location reporting schedule associated with one or both of the first UE and the second UE.

Additionally, the present disclosure describes an apparatus for polling management in a ProSe system, which may include means for receiving, at a network entity, a polling message from a first UE. In addition, the example apparatus may include means for receiving, at the network entity and after receiving the polling message, one or both of a first location report associated with the first UE and a second location report associated with a second UE. Moreover, the example apparatus may include means for determining whether to generate a polling response message upon receiving one or both of the first location report and the second location report, wherein the polling response message includes a next polling time for the first UE that is based on a location reporting schedule associated with one or both of the first UE and the second UE.

In a further aspect, the disclosure presents an example non-transitory computer-readable medium storing computer-executable code for polling management in a ProSe system, the computer-executable code comprising code for receiving, at a network entity, a polling message from a first UE. The computer-executable code may also include code for receiving, at the network entity and after receiving the polling message, one or both of a first location report associated with the first UE and a second location report associated with a second UE. Additionally, the computer-executable code may include code for determining whether to generate a polling response message upon receiving one or both of the first location report and the second location report, wherein the polling response message includes a next polling time for the first UE that is based on a location reporting schedule associated with one or both of the first UE and the second UE.

Furthermore, the present disclosure describes an example method of polling in a ProSe system, which may include transmitting, by a first UE, a polling message to a network entity. In addition, the example method may include receiving, at the first UE and after transmitting the polling message, a polling response message that includes a next polling time for the first UE that is based on a location reporting schedule associated with one or both of the first UE and a second UE. Also, the example method may include determining whether to transmit a subsequent polling message to the network entity at the next polling time included in the polling response message.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
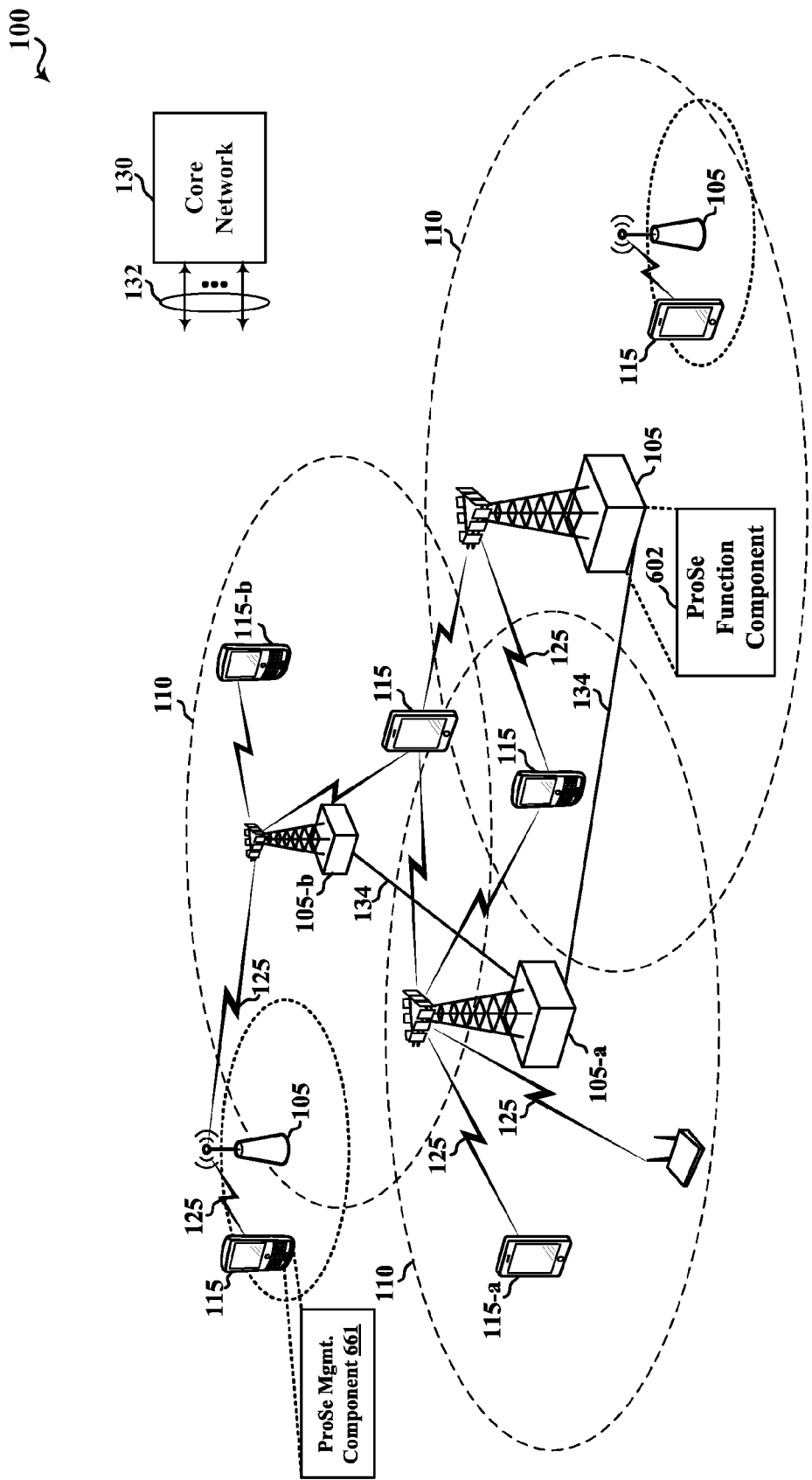
FIG. 1 shows a block diagram conceptually illustrating an example of a telecommunications system, in accordance with an aspect of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The present disclosure presents example methods and apparatuses for polling management in ProSe-compatible network entities and UEs. Specifically, aspects of the present disclosure coordinate the HTTP polling process with the Secure User Plane Location (SUPL) procedures associated with Evolved Packet Core (EPC)-level discovery.

One example advantage of such approach is that a UE is allowed to choose when to poll instead of blindly polling. Moreover the server can determine how long it should wait for data to become available for the UE before sending a response. All of these timing choices can help alleviate the above-mentioned problems associated with the conventional HTTP long-polling implementation. For example, aspects of the present disclosure minimize delay associated with the polling process for delay-sensitive ProSe procedures and avoid the above-recited drawbacks of long polling. Two such delay-sensitive ProSe procedures are the proximity alert procedure, and a network-initiated proximity request cancellation procedure, which are both related to UE location reporting.

According to an aspect of the disclosure, the ProSe function managed by a network entity may exclusively initiate those procedures after (a) a discoverer UE has initiated a proximity request procedure, and (b) the ProSe function receives new information about the location of the discoverer UE and/or the discoveree UE that the discoverer UE seeks to discover. Where the ProSe function finds that these UEs are within a certain relative geographic proximity (referred to herein simply as "in proximity"), the ProSe function may transmit a Proximity Alert message to the discoverer UE (and optionally to the discoveree UE). In an additional aspect, if the ProSe function determines the discoverer and discoveree UEs are unlikely to be in proximity within a time window provided by the discoverer UE in a proximity request, the ProSe function may transmit a Cancel Proximity Request message to the discoverer.

In a further alternative aspect, the ProSe function may be unable to determine whether or not the UEs are in proximity based on the latest available location information associated with the discoverer UE or the discoveree UE. In this case, the ProSe function may transmit a polling response message to the discoverer UE that includes a recommended next polling time for the discoverer UE to transmit its next polling message. In some examples, this next polling time included in the polling response message may be based on a location reporting schedule associated with one or both of the discoverer UE and/or the discoveree UE. As such, the ProSe function may inform the discoverer UE as to when new location information associated with the discoverer or discoveree UE will be obtained and allows the HTTP connection with the discoverer UE to be closed until this future suggested next polling time.

Alternatively, the next polling time may be based on a determination by the ProSe function regarding how likely it is that the discoverer UE and discoveree UE will be in proximity in the near future (e.g., potentially before the next location reporting events associated with either UE). In such an instance, the ProSe function may request that the location reporting schedule associated with either or both of the discoverer UE and the discoveree UE be altered such that location reports are transmitted to the ProSe function more frequently. In these cases, the next polling time included in the polling response message may correspond to this altered reporting schedule, thus allowing the discoverer UE to poll more frequently in situations where the UEs may be imminently in proximity. In another aspect, the reporting schedule for a discoveree UE may be similarly altered based on a proximity request procedure being initiated by the discoverer UE targeting the discoveree UE.

As mentioned above, in one or more aspects of the disclosure, both the discoverer and discoveree UE report their locations to the network (e.g., via the Open Mobile Alliance (OMA)-SUPL platform). For example, each UE may act as a SET (SUPL Enabled Terminal) to communicate with a network entity SLP (SUPL Location Platform) to determine the UE location. The SLP may relay the location information to the ProSe function according to a location reporting schedule to allow the ProSe function to determine whether the discoverer and discoveree UEs are in proximity. Accordingly, the Proximity Alert message, Cancel Proximity Request message, or the polling response messages including a next polling time are not arbitrarily generated by the ProSe function at any time. Instead, these messages may be generated and transmitted synchronously with the UE location reporting schedules of the discoverer and/or discoveree UEs. As such, the timing of HTTP polling message transmission is optimized such that the HTTP connection utilized for communication between the UE and the network entity implementing the ProSe function is not held open unnecessarily if a Proximity Alert message or Cancel Proximity Request message is unlikely to be generated and transmitted by the network entity.

Referring first to FIG. 1, a diagram illustrates an example of a wireless communications system 100, in accordance with an aspect of the present disclosure. The wireless communications system 100 includes a plurality of access points (e.g., base stations, eNBs, or WLAN access points) 105, a number of user equipment (UEs) 115, and a core network 130. Access points 105 may include a ProSe function component 602, which may be configured to control a ProSe function that manages ProSe operations at access points 105. In addition, one or more of UEs 115 may include ProSe management component 661 configured to manage ProSe request procedures, polling message transmission, and related transmission timing for the one or more UEs 115. Some of the access points 105 may communicate with the UEs 115 under the control of a base station controller (not shown), which may be part of the core network 130 or the certain access points 105 (e.g., base stations or eNBs) in various examples. Access points 105 may communicate control information and/or user data with the core network 130 through backhaul links 132. In examples, the access points 105 may communicate, either directly or indirectly, with each other over backhaul links 134, which may be wired or wireless communication links. The wireless communications system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

In some examples, at least a portion of the wireless communications system 100 may be configured to operate on multiple hierarchical layers in which one or more of the UEs 115 and one or more of the access points 105 may be configured to support transmissions on a hierarchical layer that has a reduced latency with respect to another hierarchical layer. In some examples a hybrid UE 115-a may communicate with access point 105-a on both a first hierarchical layer that supports first layer transmissions with a first subframe type and a second hierarchical layer that supports second layer transmissions with a second subframe type. For example, access point 105-a may transmit subframes of the second subframe type that are time division duplexed with subframes of the first subframe type.

In some examples, hybrid UE 115-a may acknowledge receipt of a transmission by providing ACK/NACK for the transmission through, for example, a HARQ scheme. Acknowledgments from hybrid UE 115-a for transmissions in the first hierarchical layer may be provided, in some examples, after a predefined number of subframes following the subframe in which the transmission was received. The hybrid UE 115-a, when operating in the second hierarchical layer may, in examples, acknowledge receipt in a same subframe as the subframe in which the transmission was received. The time required to transmit an ACK/NACK and receive a retransmission may be referred to as round trip time (RTT), and thus subframes of the second subframe type may have a second RTT that is shorter than a RTT for subframes of the first subframe type.

In other examples, a second layer UE 115-b may communicate with access point 105-b on the second hierarchical layer only. Thus, hybrid UE 115-a and second layer UE 115-b may belong to a second class of UEs 115 that may communicate on the second hierarchical layer, while legacy UEs may belong to a first class of UEs 115 that may communicate on the first hierarchical layer only. Access point 105-b and UE 115-b may communicate on the second hierarchical layer through transmissions of subframes of the second subframe type. Access point 105-b may transmit subframes of the second subframe type exclusively, or may transmit one or more subframes of the first subframe type on the first hierarchical layer that are time division multiplexed with subframes of the second subframe type. Second layer UE 115-b, in the event that access point 105-b transmits subframes of the first subframe type, may ignore such subframes of the first subframe type. Thus, second layer UE 115-b may acknowledge receipt of transmissions in a same subframe as the subframe in which the transmissions are received. Thus, second layer UE 115-b may operate with reduced latency compared to UEs 115 that operate on the first hierarchical layer.

The access points 105 may wirelessly communicate with the UEs 115 via one or more access point antennas. Each of the access points 105 sites may provide communication coverage for a respective coverage area 110. In some examples, access points 105 may be referred to as a base transceiver station, a radio base station, a radio transceiver, a basic service set (BSS), an extended service set (ESS), a NodeB, eNodeB, Home NodeB, a Home eNodeB, or some other suitable terminology. The coverage area 110 for a base station may be divided into sectors making up only a portion of the coverage area (not shown). The wireless communications system 100 may include access points 105 of different types (e.g., macro, micro, and/or pico base stations). The access points 105 may also utilize different radio technologies, such as cellular and/or WLAN radio access technologies. The access points 105 may be associated with the same or different access networks or operator deployments. The coverage areas of different access points 105, including the coverage areas of the same or different types of access points 105, utilizing the same or different radio technologies, and/or belonging to the same or different access networks, may overlap.

In LTE/LTE-A network communication systems, the terms evolved Node B (eNodeB or eNB) may be generally used to describe the access points 105. The wireless communications system 100 may be a Heterogeneous LTE/LTE-A network in which different types of access points provide coverage for various geographical regions. For example, each access point 105 may provide communication coverage for a macro cell, a pico cell, a femto cell, and/or other types of cell. Small cells such as pico cells, femto cells, and/or other types of cells may include low power nodes or LPNs. A macro cell generally covers a relatively large geographic area (e.g., several kilometers in radius) and may allow unrestricted access by UEs 115 with service subscriptions with the network provider. A small cell would generally cover a relatively smaller geographic area and may allow unrestricted access by UEs 115 with service subscriptions with the network provider, for example, and in addition to unrestricted access, may also provide restricted access by UEs 115 having an association with the small cell (e.g., UEs in a closed subscriber group (CSG), UEs for users in the home, and the like). An eNB for a macro cell may be referred to as a macro eNB. An eNB for a small cell may be referred to as a small cell eNB. An eNB may support one or multiple (e.g., two, three, four, and the like) cells.

The core network 130 may communicate with the eNBs or other access points 105 via a backhaul 132 (e.g., S1 interface, etc.). The access points 105 may also communicate with one another, e.g., directly or indirectly via backhaul links 134 (e.g., X2 interface, etc.) and/or via backhaul links 132 (e.g., through core network 130). The wireless communications system 100 may support synchronous or asynchronous operation. For synchronous operation, the access points 105 may have similar frame timing, and transmissions from different access points 105 may be approximately aligned in time. For asynchronous operation, the access points 105 may have different frame timing, and transmissions from different access points 105 may not be aligned in time. Furthermore, transmissions in the first hierarchical layer and second hierarchical layer may or may not be synchronized among access points 105. The techniques described herein may be used for either synchronous or asynchronous operations.

The UEs 115 are dispersed throughout the wireless communications system 100, and each UE 115 may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, or the like. A UE 115 may be able to communicate with macro eNodeBs, small cell eNodeBs, relays, and the like. A UE 115 may also be able to communicate over different access networks, such as cellular or other WWAN access networks, or WLAN access networks.

The communication links 125 shown in wireless communications system 100 may include uplink (UL) transmissions from a UE 115 to an access point 105, and/or downlink (DL) transmissions, from an access point 105 to a UE 115. The downlink transmissions may also be called forward link transmissions while the uplink transmissions may also be called reverse link transmissions. The communication links 125 may carry transmissions of each hierarchical layer which, in some examples, may be multiplexed in the communication links 125. The UEs 115 may be configured to collaboratively communicate with multiple access points 105 through, for example, Multiple Input Multiple Output (MIMO), carrier aggregation (CA), Coordinated Multi-Point (CoMP), or other schemes. MIMO techniques use multiple antennas on the access points 105 and/or multiple antennas on the UEs 115 to transmit multiple data streams. Carrier aggregation may utilize two or more component carriers on a same or different serving cell for data transmission. CoMP may include techniques for coordination of transmission and reception by a number of access points 105 to improve overall transmission quality for UEs 115 as well as increasing network and spectrum utilization.

As mentioned, in some examples access points 105 and UEs 115 may utilize carrier aggregation to transmit on multiple carriers. In some examples, access points 105 and UEs 115 may concurrently transmit in a first hierarchical layer, within a frame, one or more subframes each having a first subframe type using two or more separate carriers. Each carrier may have a bandwidth of, for example, 20 MHz, although other bandwidths may be utilized. Hybrid UE 115-a, and/or second layer UE 115-b may, in certain examples, receive and/or transmit one or more subframes in a second hierarchical layer utilizing a single carrier that has a bandwidth greater than a bandwidth of one or more of the separate carriers. For example, if four separate 20 MHz carriers are used in a carrier aggregation scheme in the first hierarchical layer, a single 80 MHz carrier may be used in the second hierarchical layer. The 80 MHz carrier may occupy a portion of the radio frequency spectrum that at least partially overlaps the radio frequency spectrum used by one or more of the four 20 MHz carriers. In some examples, scalable bandwidth for the second hierarchical layer type may be combined techniques to provide shorter RTTs such as described above, to provide further enhanced data rates.

Each of the different operating modes that may be employed by wireless communications system 100 may operate according to frequency division duplexing (FDD) or time division duplexing (TDD). In some examples, different hierarchical layers may operate according to different TDD or FDD modes. For example, a first hierarchical layer may operate according to FDD while a second hierarchical layer may operate according to TDD. In some examples, OFDMA communications signals may be used in the communication links 125 for LTE downlink transmissions for each hierarchical layer, while single carrier frequency division multiple access (SC-FDMA) communications signals may be used in the communication links 125 for LTE uplink transmissions in each hierarchical layer. Additional details regarding implementation of hierarchical layers in a system such as the wireless communications system 100, as well as other features and functions related to communications in such systems, are provided below with reference to the following figures.

Figure 2:
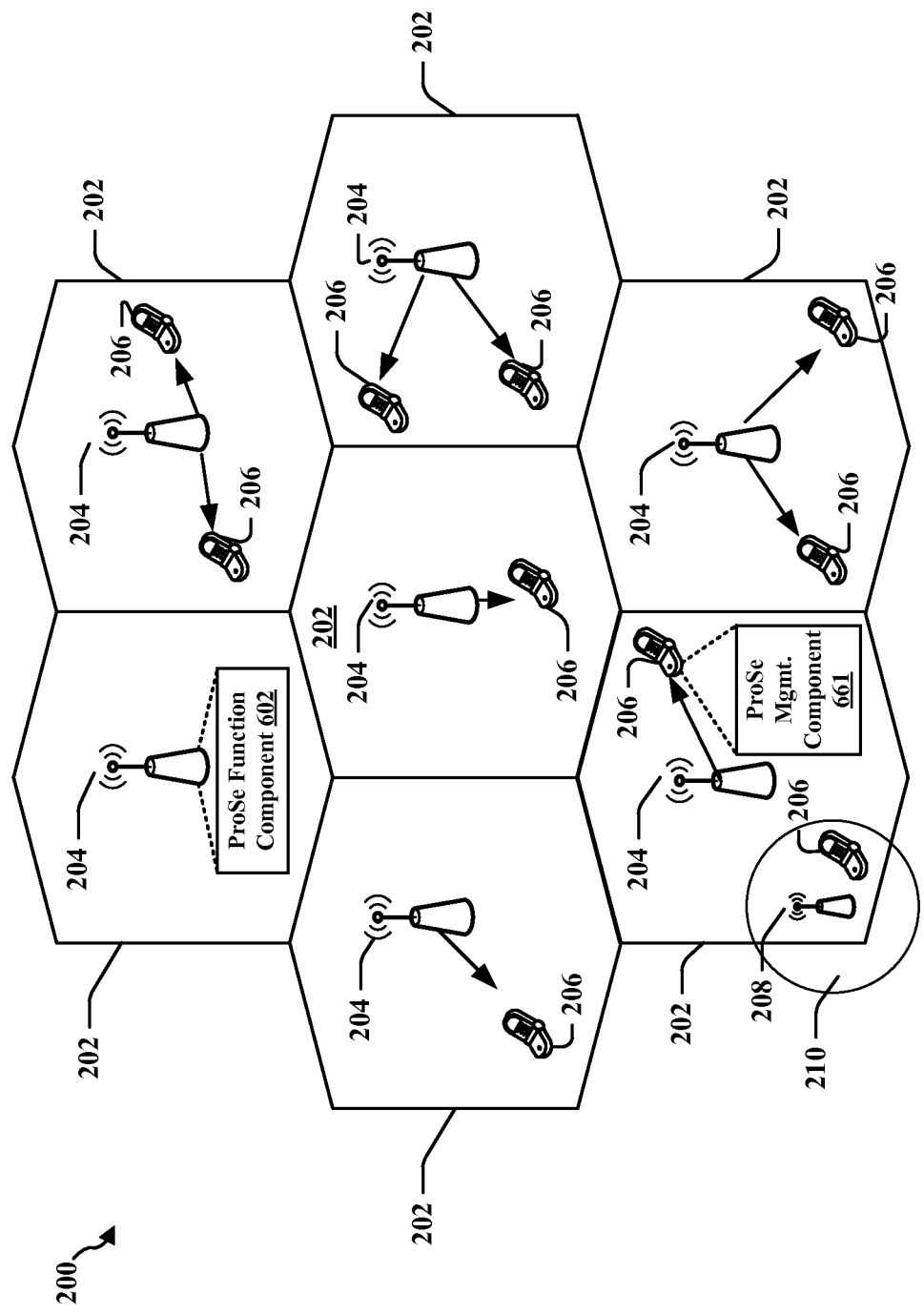
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the Evolved Packet Core for all the UEs 206 in the cells 202. In an aspect, eNBs 204 may include a ProSe function component 602, which may be configured to control a ProSe function that manages ProSe operations at eNBs 204. Similarly, one or more of UEs 206 may include ProSe management component 661 configured to manage ProSe request procedures, polling message transmission, and related transmission timing for the one or more UEs 206. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
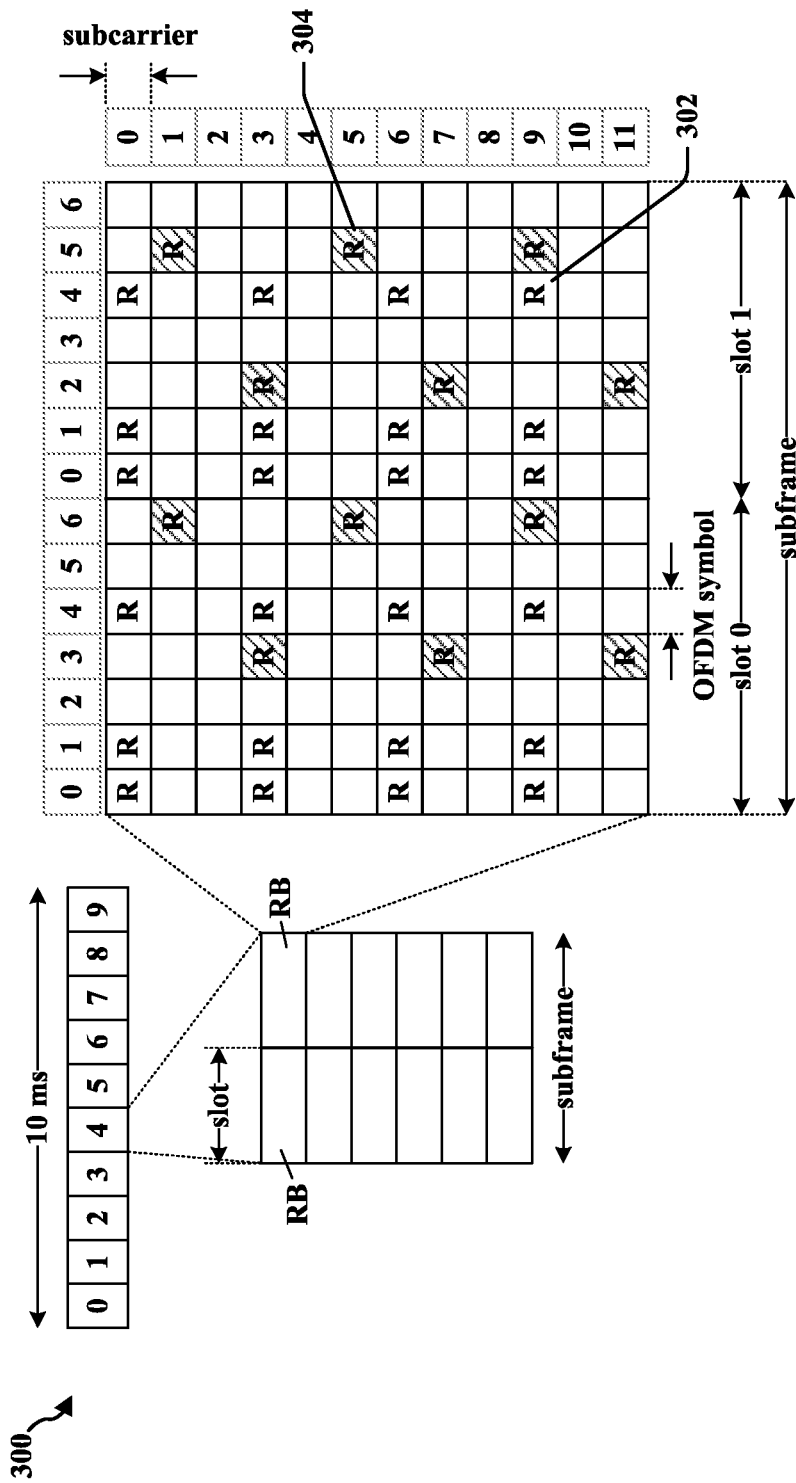
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames. Each sub-frame may include two consecutive time slots. A resource grid may be used to represent two time slots, each time slot including a resource element block. The resource grid is divided into multiple resource elements. In LTE, a resource element block may contain 12 consecutive subcarriers in the frequency domain and, for a normal cyclic prefix in each OFDM symbol, 7 consecutive OFDM symbols in the time domain, or 84 resource elements. For an extended cyclic prefix, a resource element block may contain 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource element blocks upon which the corresponding PDSCH is mapped. The number of bits carried by each resource element depends on the modulation scheme. Thus, the more resource element blocks that a UE receives and the higher the modulation scheme, the higher the data rate for the UE.

Figure 4:
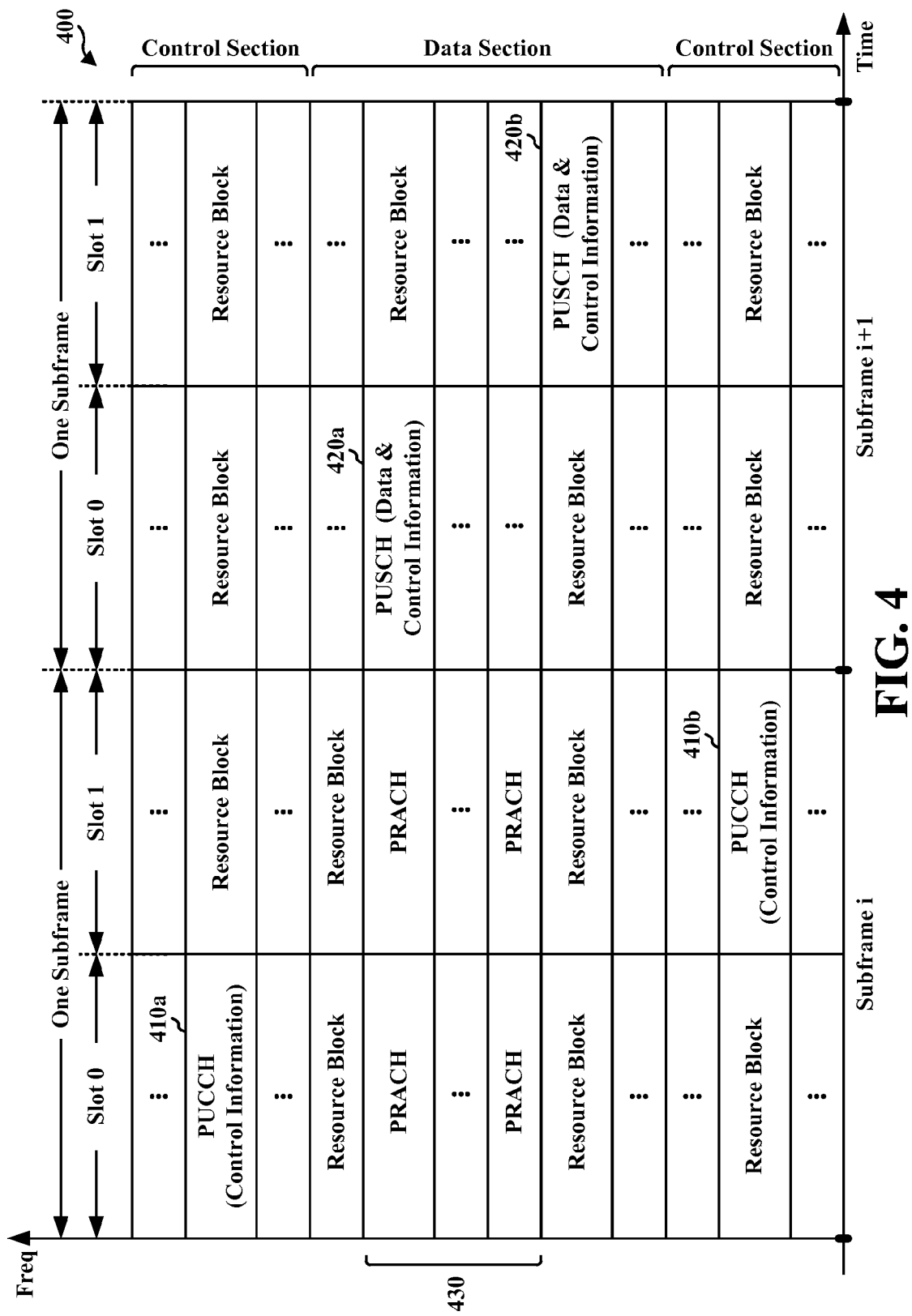
FIG. 4 is a diagram illustrating an example of an UL frame structure in LTE.

FIG. 4 is a diagram 400 illustrating an example of an UL frame structure in LTE. The available resource element blocks for the UL may be partitioned into a data section and a control section. The control section may be formed at the two edges of the system bandwidth and may have a configurable size. The resource element blocks in the control section may be assigned to UEs for transmission of control information. The data section may include all resource element blocks not included in the control section. The UL frame structure results in the data section including contiguous subcarriers, which may allow a single UE to be assigned all of the contiguous subcarriers in the data section.

A UE may be assigned resource element blocks 410a, 410b in the control section to transmit control information to an eNB. The UE may also be assigned resource element blocks 420a, 420b in the data section to transmit data to the eNB. The UE may transmit control information in a physical UL control channel (PUCCH) on the assigned resource element blocks in the control section. The UE may transmit only data or both data and control information in a physical UL shared channel (PUSCH) on the assigned resource element blocks in the data section. A UL transmission may span both slots of a subframe and may hop across frequency.

A set of resource element blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource element blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
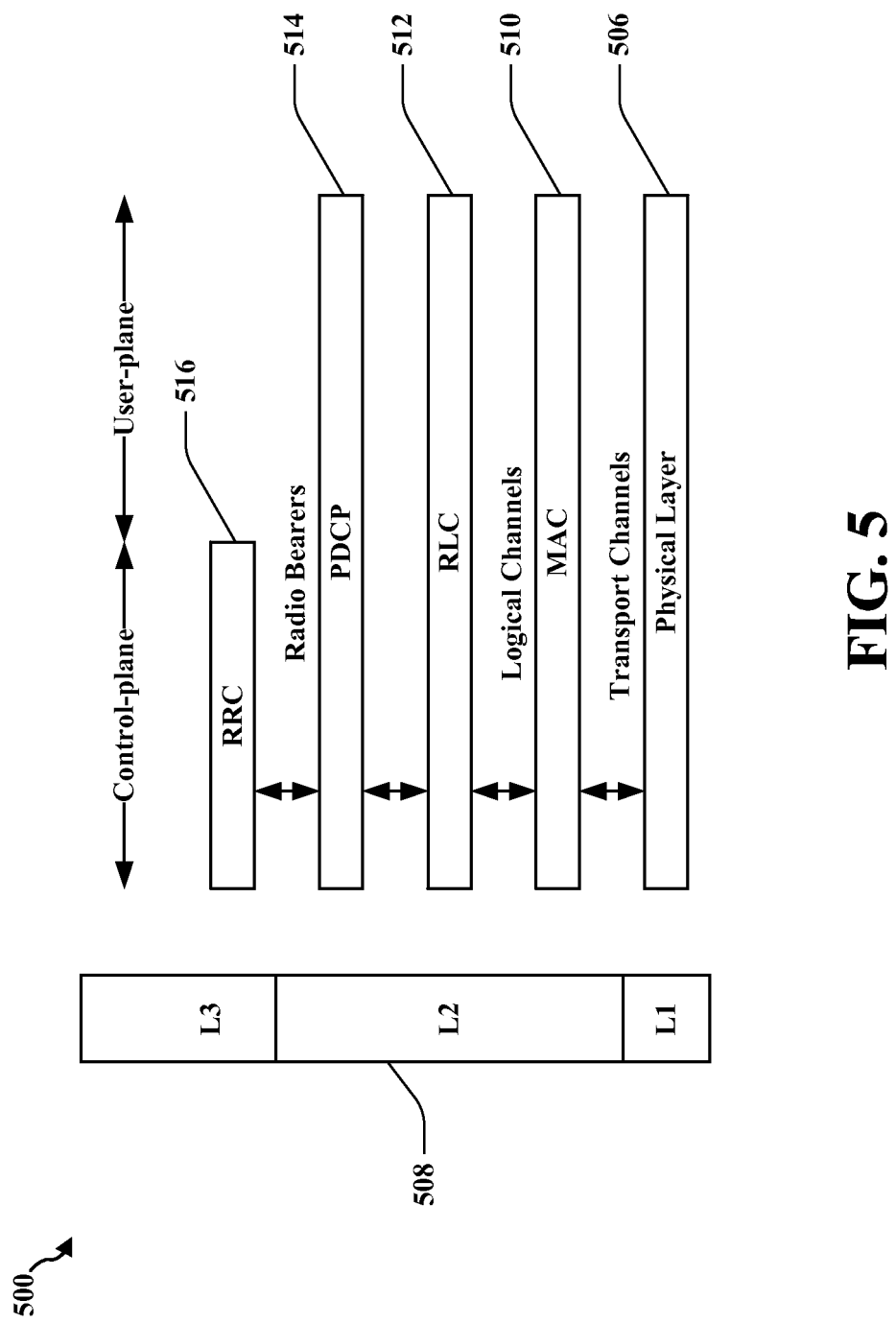
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource element blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
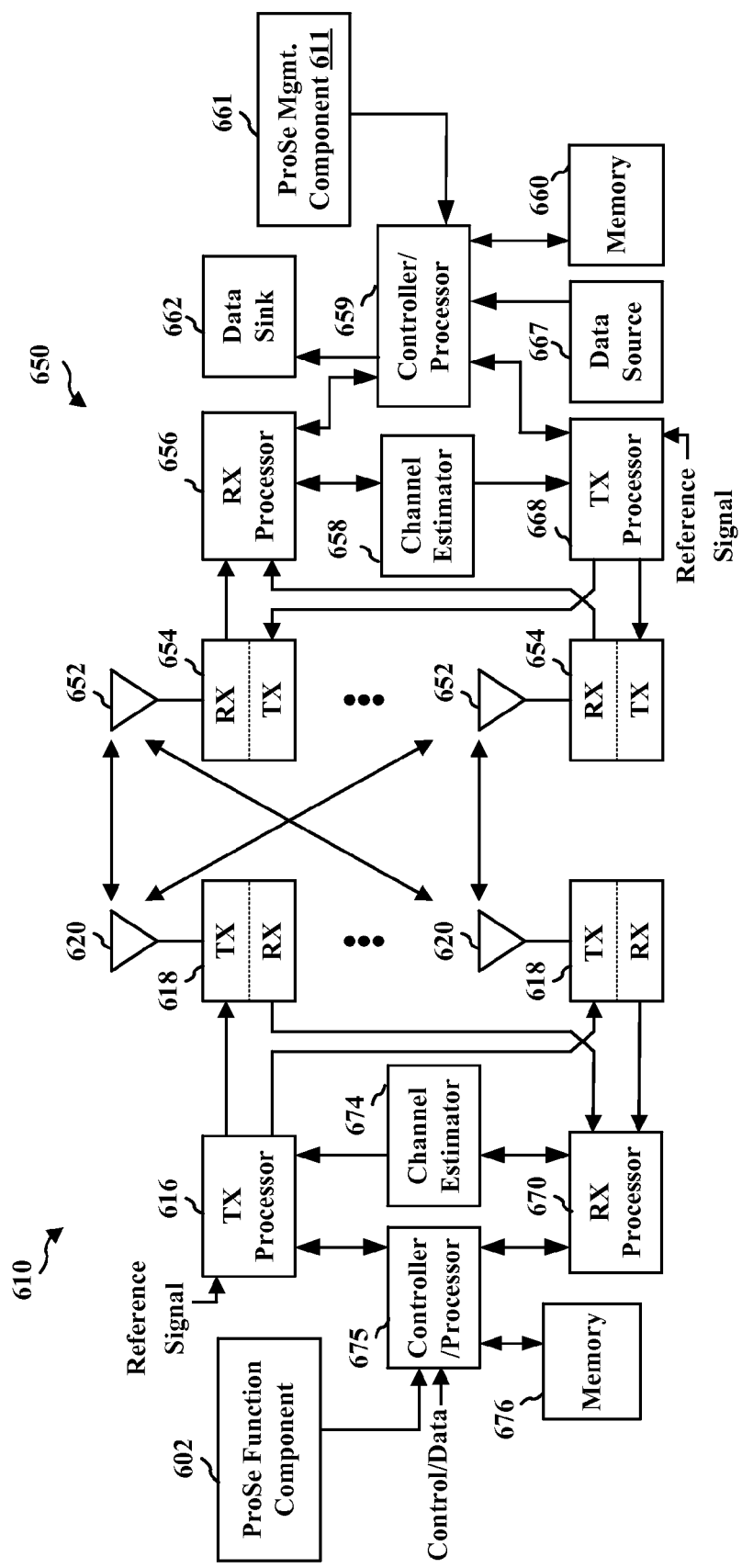
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission. In addition, eNB 610 may include a ProSe function component 602, which may be configured to control a ProSe function that manages ProSe operations at eNB 610.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations. In addition, UE 650 may include ProSe management component 661 configured to manage ProSe request procedures, polling message transmission, and related transmission timing for the one or more UE 650.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
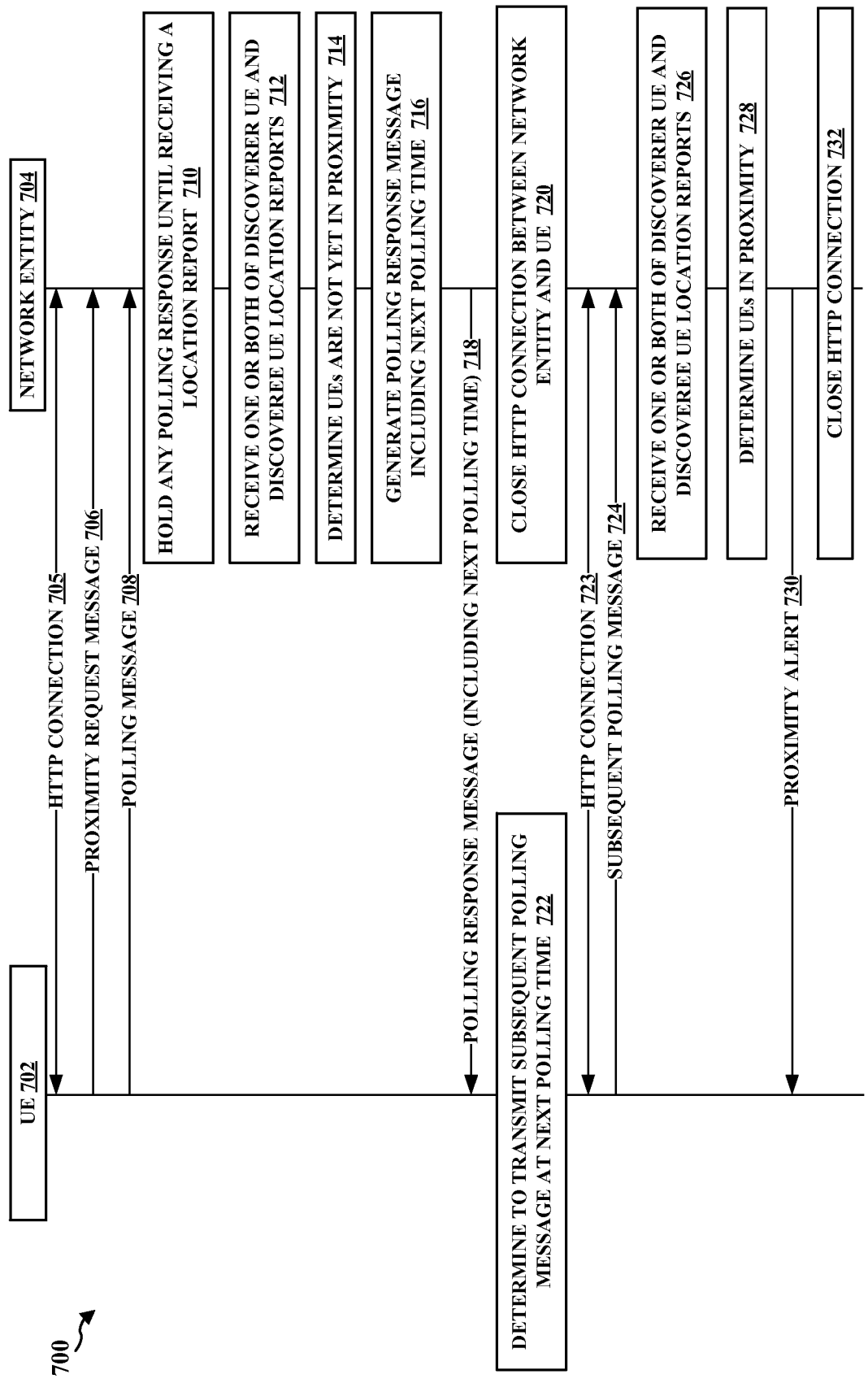
FIG. 7 is a flow diagram illustrating an example message flow according to aspects of the present disclosure.

FIG. 7 is a flow diagram illustrating an example message flow 700 for an example ProSe operation involving at least a UE 702 and at least one network entity 704. In some examples, UE 702 may comprise a discoverer UE and network entity 704 may include or otherwise implement a ProSe function corresponding to UE 702. For purposes of the following discussion of FIG. 7 and the present disclosure, generally, any functions or methods performed by the network entity 704 may be performed by a ProSe function implemented by the network entity 704.

In an aspect, UE 702 and/or network entity 704 may initiate an HTTP connection 705 between the UE 702 and network entity 704. Further, UE 702 may generate and transmit a proximity request message 706 to the network entity 704. In some examples, the proximity request message 706 may include a discoveree UE identifier, and may be generated to determine a location of the discoveree UE (not shown) corresponding to the discoveree UE identifier. In an aspect, for example, discoveree UE identifier may be any set of information that enables identification of a UE, such as but not limited to an associated application-layer user ID, a unique device identifier, a telephone number, etc. In addition, the proximity request message 706 may include a timing window that serves as a time period for which the proximity request is requested. In other words, when the time period expires, the proximity request procedure associated with the proximity request message 706 may be aborted and any HTTP connections may be closed.

In addition, upon transmission of the proximity request message, the UE 702 may transmit a polling message 708 to network entity 704 in order to determine, based on a response from the network entity 704, whether the discoveree UE is in proximity with the UE 702.

Further, at block 710, in response to receiving the polling message 708, the network entity 704 may hold any polling response (e.g., Proximity Alert, Cancel Proximity Request, or polling response message including a next polling time) and may leave the HTTP connection 705 open until receiving a location report associated with one or both of the discoverer UE 702 and the discoveree UE. Furthermore, at block 712, the network entity 704 may receive a location report from one or both of discoverer UE 702 and the discoveree UE.

In an aspect, although not explicitly shown in message flow 700, the discoverer UE location report may be received from an SLP network entity managing SLP location reporting for UE 702 and the discoveree location report may be received from a network entity managing a ProSe function associated with the discoveree UE. For example, in an aspect, one or both of the discoverer UE and the discoveree UE may generate and transmit a position estimate to the SLP associated with the UE. These individual SLPs may be configured to generate a location reporting message based on the position estimate and transmit the location reporting message to the network entity after the first UE transmits the polling message. In another aspect, rather than generating and transmitting the position estimate to the SLP associated with the respective discoverer or discoveree UE, the UE may transmit a location measurement to the SLP. The SLP may be configured to generate a location estimate for the UE (discoverer or discoveree) based on the location measurement and may generate a location reporting message that includes the generated location estimate. The SLP may then transmit the location reporting message to the network entity after the discoverer UE transmits the polling message.

Turning to block 714, in an example, the network entity 704 may determine that the discoverer UE 702 and the discoveree UE are not in proximity based on the location report or location reports received at block 712. In an aspect, the determination as to whether the UEs are in proximity may include determining whether the UEs are within a certain geographic proximity that may be defined by the ProSe function. For example, this geographic proximity may take any relative geographic location value, such as, but not limited to, a few feet or up to many miles. Alternatively, the proximity may be based on a location associated with a cell, sector, or eNB identifier (ID) corresponding to a serving cell, sector, or eNB of the UE.

In addition, at block 716, based on determining that the UEs are not yet in proximity (and potentially based on a determination that the UEs may be in proximity in some defined time interval in the future), the network entity 704 may generate a polling response message that includes a next polling time. In an aspect, the next polling time included in the polling response message may be based on a location reporting schedule of one or both of the discoverer UE 702 and the discoveree UE. In some examples, these location reporting schedules may be received from the UEs themselves or from an SLP entity associated with the UEs, and may be stored at network entity 704 such that they may be utilized by the ProSe function to determine the next polling time for the polling response message.

Furthermore, once the polling response message is generated at block 716, the network entity 704 may transmit the polling response message 718, which includes the next polling time, to UE 702. Additionally, upon transmitting the polling response message 718, the network entity 704 may close the HTTP connection 705 between the UE 702 and the network entity 704 at block 720.

Upon receiving the polling response message 718, the UE 702 may determine whether to transmit a subsequent polling request at the next polling time included in the polling response message 718. In some examples, instead of transmitting the subsequent polling request at the next polling time included in the polling response message 718, the UE 702 may poll immediately after receiving the polling response message, at a time that is just before (e.g., at a specified back-up time period before) a next location report is to be transmitted to network entity 704, or at any other time specified by UE 702. Though these alternative options are available, UE 702 may determine to transmit the subsequent polling message at the next polling time included in the polling response message 718 at block 722.

After the determination is made at block 722, the UE 702 may wait for the next polling time included in the polling response message 718 and may then transmit the subsequent polling message 724 to network entity 704. In addition, UE 702 may initiate an HTTP connection 723 with network entity 704 to facilitate transmission of the subsequent polling message 724.

Returning to operation of the network entity 704, the network entity 704 may receive the subsequent polling message 724. Furthermore, after receiving subsequent polling message 724, the network entity 704 may receive location reports associated with one or both of discoverer UE and discoveree UE at block 726. Like the location reports received at block 712, although not explicitly shown in message flow 700, the discoverer UE location report may be received from an SLP network entity managing SLP location reporting for UE 702 and the discoveree location report may be received from a network entity managing a ProSe function associated with the discoveree UE. Moreover, although not specifically shown in relation to subsequent polling message 724, the network entity 704 may hold the transmission of any polling response until at least one location report is received at block 726.

Next, at block 728, the ProSe function of network entity 704 may determine that the discoverer UE 702 and the discoveree UE are within proximity based on the location(s) indicated by one or both of the location reports associated with discoverer UE 702 and discoveree UE received at block 726. Based on this determination, the network entity 704 may transmit a Proximity Alert 730 to the UE 702, which indicates that the discoverer UE 702 and discoveree UE are in proximity. Upon transmitting the Proximity Alert 730, the network entity 704 may close the HTTP connection at block 732 as the ProSe request process has concluded.

Furthermore, it should be noted that, although not explicitly shown in message flow 700, instead of determining that the UEs are in proximity at block 728, the ProSe function of network entity 704 may determine that the UEs are not in proximity and/or that the UEs have a low probability of being in proximity within a given future timeframe (e.g., a determination that a Proximity Alert is not imminent). In such an example, instead of transmitting Proximity Alert 730, the network entity 704 may generate and transmit a Cancel Proximity Request and close the HTTP connection.

Figure 8:
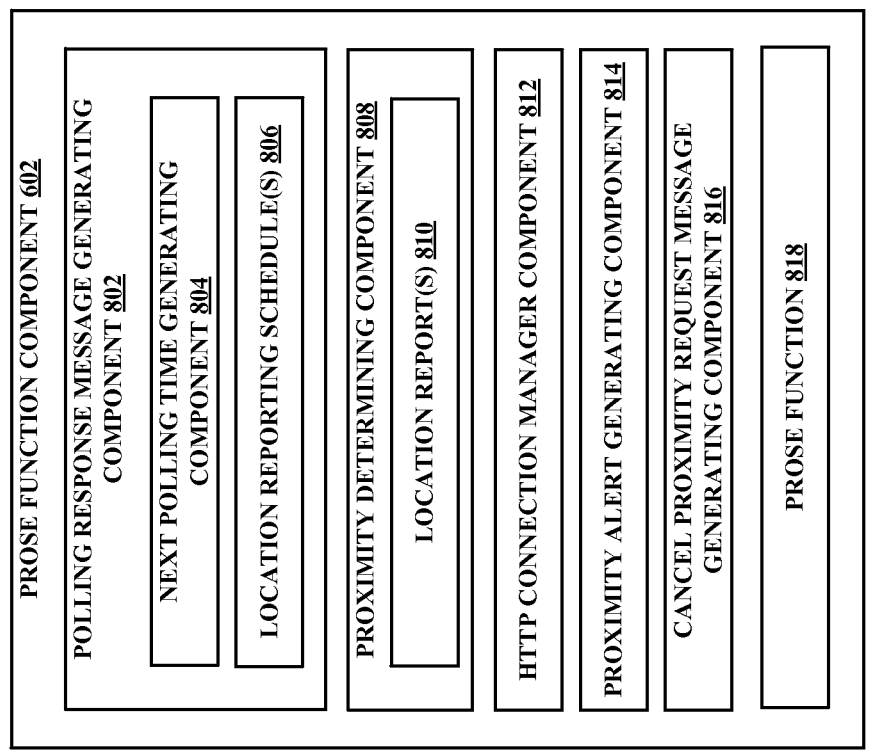
FIG. 8 is a diagram illustrating a ProSe function component configured to implement aspects of the present disclosure.

FIG. 8 is a block diagram containing a plurality of sub-components of a ProSe function component 602 (see FIG. 6), which may be configured to control a ProSe function 818 that manages ProSe operations, such as the actions described in FIG. 7, at each of one or more network entities. In an aspect, ProSe function component 602 may include a polling response message generating component 802, which may be configured to generate one or more polling response messages associated with one or more polling messages received from a UE. In an aspect, the polling response message may comprise a Proximity Alert message, a Cancel Proximity Request message, or a polling response message that indicates a next polling time for the UE to transmit a subsequent polling message. Moreover, polling response message generating component 802 is configured to hold any polling response until receiving a location report, as described above.

Furthermore, ProSe function component 602 may include a next polling time generating component 804, which may be configured to generate a next polling time to be potentially transmitted in a polling response message (e.g., where a Proximity Alert message or Cancel Proximity Request message is not generated). In an aspect, the next polling time generating component 804 may be configured to generate the next polling time based on one or more location reporting schedules 806 corresponding to one or more UEs, which may include a discoverer UE and a discoveree UE. For example, when generating the next polling time, next polling time generating component may determine a next scheduled location reporting event for either of the discoverer UE or the discoveree UE based on the location reporting schedules 806. The next polling time generating component 804 may then set the next polling time to correspond to the next scheduled location reporting event or just before (e.g., a configured time interval preceding) the next scheduled location reporting event.

In addition, ProSe function may include a proximity determining component 808, which may be configured to determine whether the discoverer UE and the discoveree UE are within a proximity to one another based on UE locations included in one of more location reports 810. In an aspect, proximity determining component 808 may be configured to determine whether the UEs are in proximity by determining whether the UEs are within a certain geographic proximity that may be defined by the ProSe function 818. For example, this geographic proximity may take any relative geographic location value, such as, but not limited to, a few feet or up to many miles. Alternatively, the proximity may be based on a location associated with a cell, sector, or eNB ID corresponding to a serving cell, sector, or eNB of the UE.

In addition, proximity determining component 808 may be configured to determine a probability that the UEs will come into proximity within a certain timeframe (e.g., within a time window included in a proximity request message sent by the discoverer UE, or within any other configured timeframe). In some examples, ProSe function component 602 may determine that, although the UEs are not currently in proximity based on the most recent location reports 810, the UEs are likely (e.g., have a likelihood greater than or equal to a threshold value) to be in proximity within a particular timeframe. Such a determination can be made based on one or more movement trends derived from one or more past and/or current location reports 810, for example. Where it is determined that the UEs are likely to come into proximity within the timeframe, the ProSe function component 602 may transmit a message to the SLP entity associated with one or both of the UEs and/or the UEs themselves to alter (e.g., make location report transmissions more frequent) the location reporting schedule 806 of one or both of the discoverer UE and the discoveree UE. By altering the location reporting schedules to be more frequent, ProSe function component 602 may allow a Proximity Alert to be generated more quickly relative to a previous location reporting schedule, and may thus provide greater temporal accuracy with regard to when the UEs come into proximity.

Furthermore, ProSe function component 602 may include an HTTP connection manager component 812, which may be configured to establish or close one or more HTTP connections between a network entity and one or more UEs. In an aspect, the HTTP connection manager component 812 may be configured to establish an HTTP connection in response to a request from a UE to initiate a connection. In an aspect, the HTTP connection manager component 812 may be configured to close an HTTP connection upon transmitting a Proximity Alert message, Cancel Proximity Request message, or polling response message that includes a next polling time.

In an additional aspect, ProSe function component 602 may include a Proximity Alert generating component 814, which may be configured to generate a Proximity Alert for transmission to a UE where proximity determining component 808 determines that a discoverer UE and a discoveree UE are in proximity. In addition, ProSe function component 602 may include a Cancel Proximity Request generating component 814, which may be configured to generate a Cancel Proximity Request message, for example, where the proximity determining component 808 determines that the discoverer UE and the discoveree UE are not within proximity and/or that the UEs will not come into proximity within a certain timeframe (e.g., within a time window included in a proximity request message sent by the discoverer UE).

Figure 9:
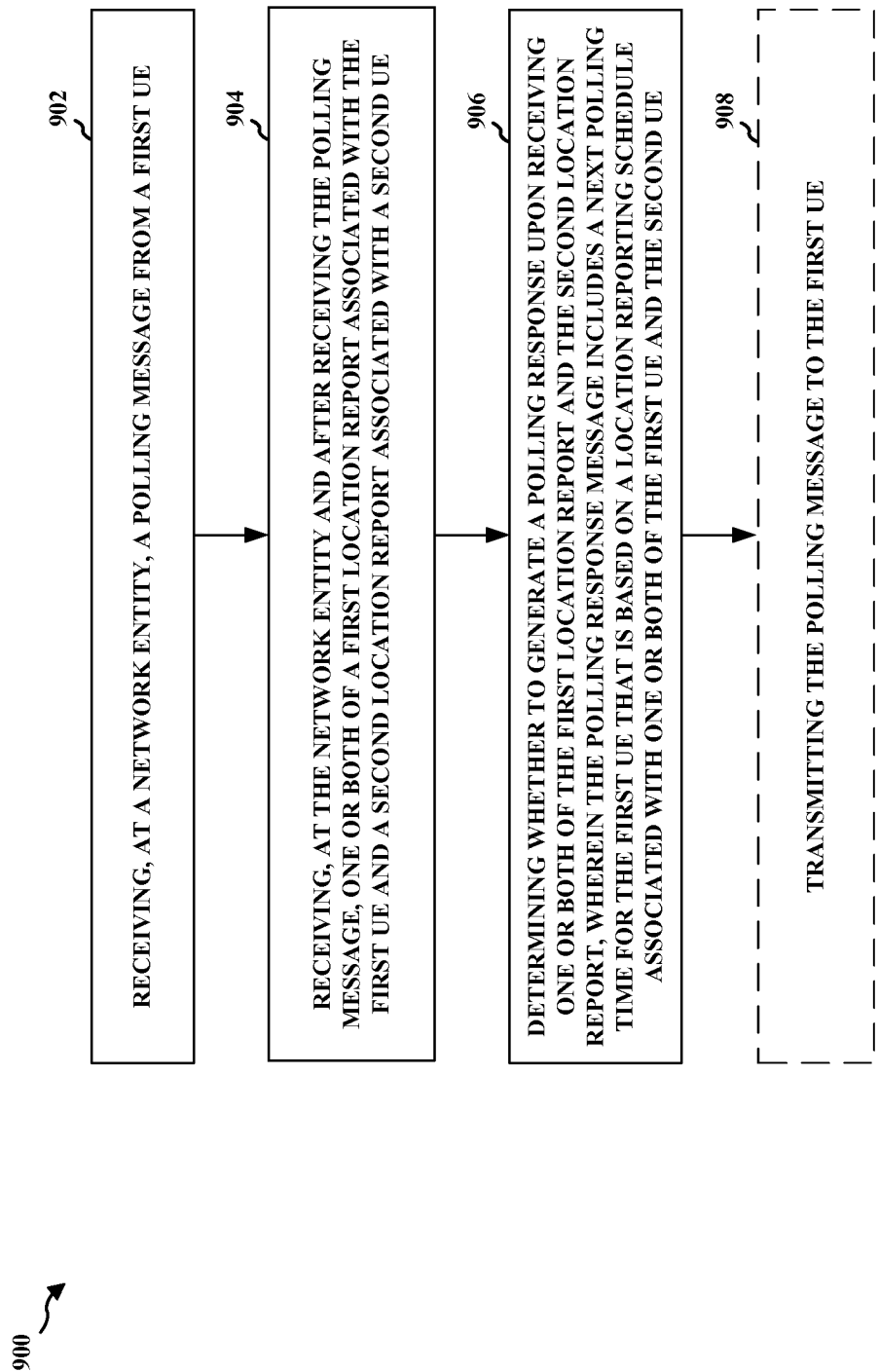
FIG. 9 is a flow chart of a method of polling management in a ProSe system.

FIG. 9 illustrates an example method 900 for polling management in a ProSe system of the present disclosure, which may be performed by a network entity (e.g., an eNodeB) and/or a ProSe function executed or managed by the network entity. In an aspect, method 900 may include, at block 902, receiving, at a network entity, a polling message from a first UE, which may comprise a discoverer UE that has initiated a polling request procedure. In addition, method 900 may include, at block 904, receiving, at the network entity and after receiving the polling message, one or both of a first location report associated with the first UE and a second location report associated with a second UE. In an aspect, the second UE may comprise a discoveree UE having an application-layer user ID included in a polling request message from the UE that initiated the polling request procedure. In some examples, blocks 902 and 904 may be performed by receiving module 1004 of FIG. 10 (discussed below) and/or receiver 618RX or RX processor 670 of FIG. 6.

Furthermore, method 900 may include, at block 906, determining whether to generate a polling response message upon receiving one or both of the first location report and the second location report. In an aspect, the polling response message generated at block 906 may include a next polling time for the first UE that is based on a location reporting schedule associated with one or both of the first UE and the second UE. The determination of block 906 may be made, for example, based on a location of the first UE and/or the second UE reported in the first or second location reports received at block 904. In addition, in some examples, block 906 may be performed by polling response message generating component 802 of FIG. 8.

In an optional aspect (as indicated by the dotted lines), method 900 may include, at block 908, transmitting the polling message to the first UE. In some examples, block 908 may be performed by transmission module 1006 of FIG. 10 (discussed below), or transmitter 618TX or TX processor 616 of FIG. 6. In addition, method 900 may include further optional aspects not explicitly shown in FIG. 9. For example, method 900 may include closing a HTTP connection between the network entity and the first UE upon transmitting the polling response message, or upon transmitting a Proximity Alert or Cancel Proximity Request. In addition, method 900 may optionally include determining to generate the polling response message where neither of a Proximity Alert or a Cancel Proximity Request is generated based on one or both of the first location report and the second location report.

In an additional optional aspect, method 900 may include receiving, at the network entity and prior to receiving the polling message, a proximity request procedure initiation message from the first UE. In such examples, the proximity request procedure initiation message may cause the generating of the polling response to be triggered based on the receiving of one or both of the first location report and the second location report. Furthermore, the next polling time for the first UE generated at block 904 may be further based on a probability that the second UE will be in proximity to the first UE within a time period.

In addition, although example method functions are presented above with respect to method 900, these are not exclusive. Instead, any function or aspect of improved ProSe functionality described by the present disclosure may be included in method 900.

Figure 10:
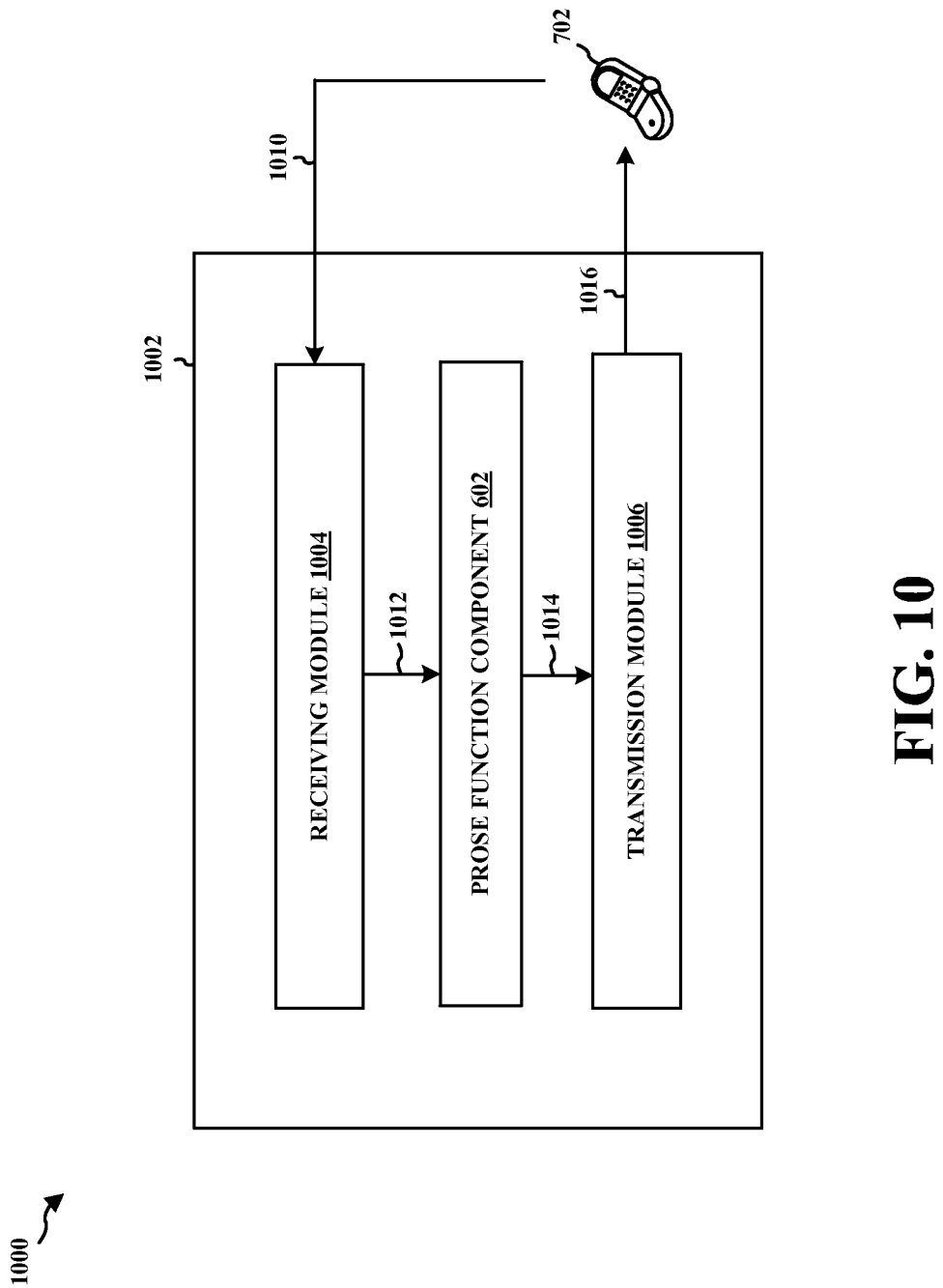
FIG. 10 is a conceptual data flow diagram illustrating the data flow between different modules/means/components in an exemplary apparatus.

FIG. 10 is a conceptual data flow diagram 1000 illustrating the data flow between different modules/means/components in an exemplary apparatus 1002. The apparatus 1002 may be a network entity, such as, but not limited to, an eNodeB, which may include access point 105 of FIG. 1, macro eNB 204 or low power class eNB 208 of FIG. 2, eNB 610 of FIG. 6, or network entity 704 of FIG. 7. The apparatus 1002 includes a receiving module 1004 that is configured to receive uplink messages 1010 (e.g., proximity request messages, polling messages, etc. transmitted to apparatus 1002 by one or more UEs 702), ProSe function component 602 and its related subcomponents (see, e.g., FIG. 8), and a transmission module 1006 that is configured to transmit downlink messages 1016 (e.g., Proximity Alert messages, Cancel Proximity Request messages, and/or polling response messages including a next polling time to one or more UEs 702).

The receiving module 1004, ProSe function component 602 (and the subcomponents thereof in FIG. 8), or the transmission module 1006 may perform one or more aspects of the aforementioned method 900 of FIG. 9. For instance, receiving module 1004 may be configured to receive one or more polling messages from one or more UEs 702 (which may include a first UE and a second UE, for example). In addition, receiving module 1004 may be configured to receive (e.g., after receiving the polling message or messages) one or both of a first location report associated with a first UE and a second location report associated with a second UE. The receiving module 1004 may forward the polling message and/or the first and second location reports 1012 to the ProSe function component 602, and as such, the ProSe function component 602 may obtain the polling message and/or the first and second location reports 1010. The ProSe function component 602 may determine whether to generate a polling response message upon receiving one or both of the first location report and the second location report. In addition, where it determines that a polling response message is to be generated, the downlink scheduling component 602 may include, in the polling response message, a next polling time for the first UE that is based on a location reporting schedule associated with one or both of the first UE and the second UE. The ProSe function component 602 may send the generated polling response message 1014 to the transmission module 1006. The transmission module 1006 may be configured to transmit at least the polling response message 1016 to the one or more UEs 702.

In addition, the apparatus 1002 may include additional modules that perform each of the steps of method 900 of FIG. 9. As such, each step in the aforementioned method 900 of FIG. 9 may be additionally or alternatively performed by an additional module and the apparatus 1002 may include one or more of those additional modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 11:
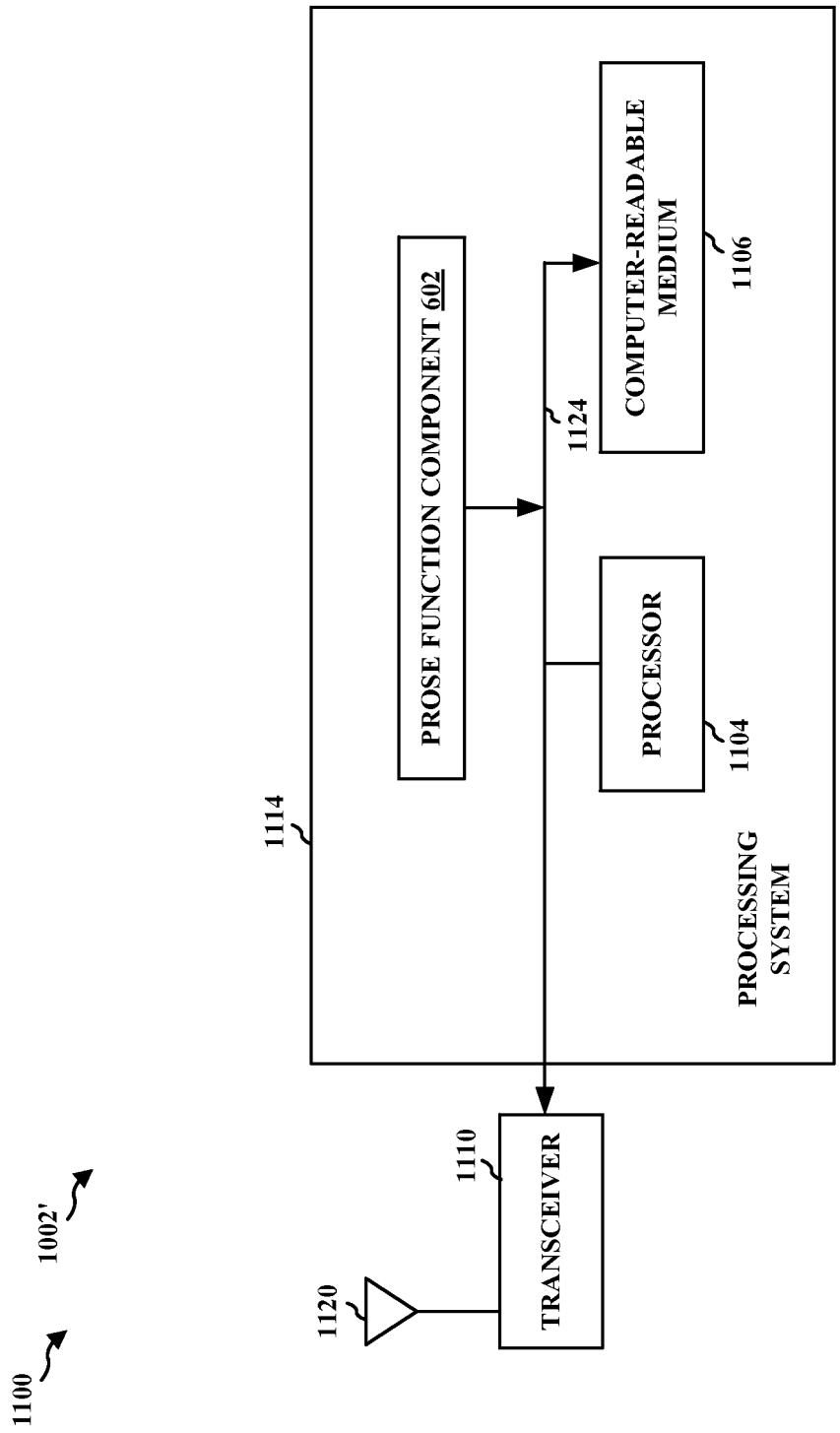
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The apparatus 1002' may be a network entity, such as, but not limited to, an eNodeB, which may include access point 105 of FIG. 1, macro eNB 204 or low power class eNB 208 of FIG. 2, eNB 610 of FIG. 6, network entity 704 of FIG. 7, or network entity 1002 of FIG. 10. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware modules, represented by the processor 1104, the ProSe function component 602 and its related subcomponents (see, e.g., FIG. 8), and the computer-readable medium 1106. The bus 1124 may also link various other circuits such as timing sources, peripherals, voltage regulators, and power management circuits, which are well known in the art, and therefore, will not be described any further.

The processing system 1114 may be coupled to a transceiver 1110, which, in some examples, may include receiving module 1004 and transmission module 1006 of FIG. 10. The transceiver 1110 is coupled to one or more antennas 1120. The transceiver 1110 provides a means for communicating with various other apparatus over a transmission medium. In addition, the transceiver 1110 may be configured to transmit messages (e.g., Proximity Alert messages, Cancel Proximity Request messages, and/or polling response messages including a next polling time) to one or more UEs. The processing system 1114 includes a processor 1104 coupled to a computer-readable medium 1106. The processor 1104 is responsible for general processing, including the execution of software stored on the computer-readable medium 1106. The software, when executed by the processor 1104, causes the processing system 1114 to perform the various functions described supra for any particular apparatus. The computer-readable medium 1106 may also be used for storing data that is manipulated by the processor 1104 when executing software. The processing system further includes ProSe function component 602 and its related subcomponents (see, e.g., FIG. 8). The modules/components may be software modules running in the processor 1104, resident/stored in the computer-readable medium 1106, one or more hardware modules coupled to the processor 1104, or some combination thereof. The processing system 1114 may be a component of the eNB 610 and may include the memory 676 and/or at least one of the TX processor 616, the RX processor 670, and the controller/processor 675.

In one configuration, the apparatus 1002' for wireless communication includes means for receiving a polling message from a first UE; means for receiving, after receiving the polling message, one or both of a first location report associated with the first UE and a second location report associated with a second UE; and means for determining whether to generate a polling response message upon receiving one or both of the first location report and the second location report, wherein the polling response message includes a next polling time for the first UE that is based on a location reporting schedule associated with one or both of the first UE and the second UE. The aforementioned means may be one or more of the aforementioned modules of the apparatus 1002 and/or the processing system 1114 of the apparatus 1002' configured to perform the functions recited by the aforementioned means. As described supra, the processing system 1114 may include the TX Processor 616, the RX Processor 670, and the controller/processor 675. As such, in one configuration, the aforementioned means may be the TX Processor 616, the RX Processor 670, and the controller/processor 675 configured to perform the functions recited by the aforementioned means.

Figure 12:
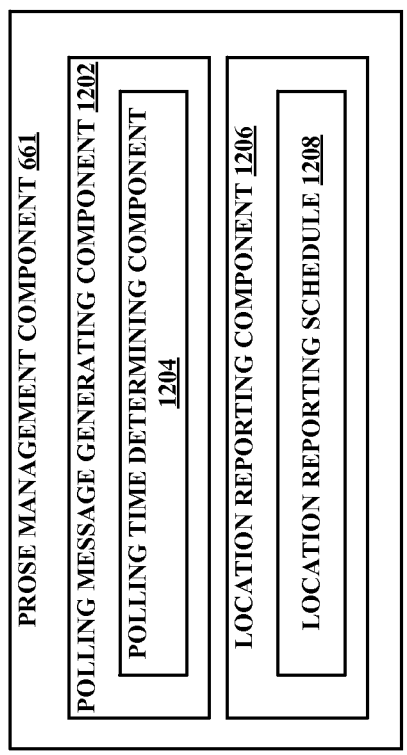
FIG. 12 is a diagram illustrating a ProSe management component configured to implement aspects of the present disclosure.

FIG. 12 is a block diagram containing a plurality of sub-components of a ProSe management component 661 (see FIG. 6), which may reside in a UE and may be configured to manage ProSe request procedures, polling message transmission, and related transmission timing for the one or more UEs. In an aspect, ProSe management component 661 may include a polling message generating component 1202, which may be configured to generate one or more polling messages related to a ProSe process. In addition, polling message generating component 1202 may include a polling time determining component 1204, which may be configured to determine or select a polling time for one or more polling messages. For example, polling time determining component 1204 may select a next polling time be based on a next polling time received in a polling response message.

Alternatively, the next polling time selected by the polling time determining component 1204 may be associated with a schedule location report transmission based on location reporting schedule 1208. In other words, in an aspect of the present disclosure, polling message generating component 1202 may generate and/or transmit a polling message just before (e.g., at a specified back-up time period before) a next location report is to be transmitted to a network entity managing a ProSe function.

In a further aspect of the disclosure, the polling message generating component 1202 may not initiate polling (e.g., by generating a polling message) or may reduce the frequency at which polling messages are generated or transmitted unless the UE (a) has initiated a proximity request procedure, (b) has been requested by the network (e.g., by the network entity managing the ProSe function) to initiate periodic location reporting, or both (a) and (b) have occurred.

In addition, ProSe management component 661 may include a location reporting component 1206, which may be configured to generate and transmit one or more location reports (e.g., alone or in conjunction with an SLP entity of the network) to the network entity managing the ProSe function. In an aspect, the location reporting component 1206 may generate and/or transmit the location reports according to the location reporting schedule 1208, which, in some instances, may be altered by the network entity managing the ProSe function.

Figure 13:
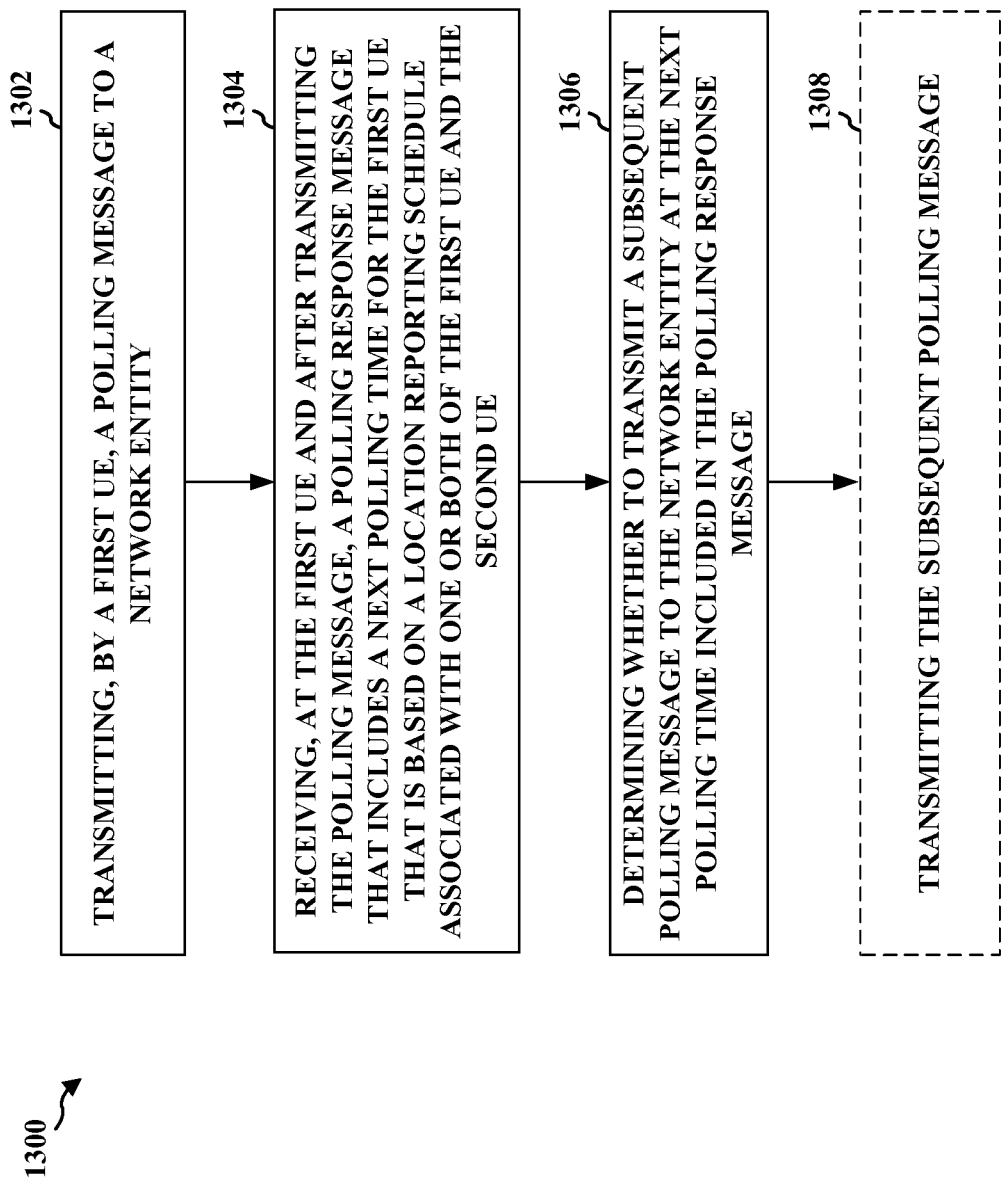
FIG. 13 is a flow chart of a method of polling in a ProSe system.

FIG. 13 illustrates an example method 1300 of polling in a ProSe system of the present disclosure, which may be performed by a UE of the ProSe system. In an aspect, method 1300 may include, at block 1302, transmitting, by a first UE (e.g., a discoverer UE), a polling message to a network entity managing or implementing a ProSe function associated with the first UE. Furthermore, the UE may not perform block 1302 and transmit the polling message unless the UE (a) has initiated a proximity request procedure, (b) has been requested by the network (e.g., by the network entity managing the ProSe function) to initiate periodic location reporting, or both (a) and (b) have occurred. In some examples, block 1302 may be performed by transmission module 1406 of FIG. 14 (below), transceiver 1510 of FIG. 15 (below), and/or transmitter 654TX of FIG. 6.

In a further aspect, method 1300 may include, at block 1304, receiving, at the first UE and after transmitting the polling message, a polling response message that includes a next polling time for the first UE that is based on a location reporting schedule associated with one or both of the first UE and a second UE. In some examples, block 1304 may be performed by receiving module 1404 of FIG. 14 (below), transceiver 1510 of FIG. 15 (below), and/or receiver 654RX of FIG. 6.

Additionally, method 1300 may include, at block 1306, determining whether to transmit a subsequent polling message to the network entity at the next polling time included in the polling response message. In some examples, the UE may determine to transmit the subsequent polling message based on the next polling time included in the polling response message. However, in some examples the UE may essentially ignore the next polling time included in the polling response message, and may send the subsequent polling message immediately, at a time based on its location reporting schedule (e.g., just before the next location report is to be transmitted), or at any other subsequent time. Block 1306 may be performed by polling time determining component 1204 and/or polling message generating component 1202 of FIG. 12.

In an optional aspect (as indicated by the dotted lines), at block 1308, method 1300 may further include transmitting the subsequent polling message to the network entity managing the ProSe function. Furthermore, although not shown in FIG. 13, several optional aspects may be included in method 1300. For example, method 1300 may further include transmitting a location reporting message to the network entity upon transmitting the polling message.

In addition, although example method functions are presented above with respect to method 1300, these are not exclusive. Instead, any function or aspect of improved ProSe functionality described by the present disclosure may be included in method 1300.

Figure 14:
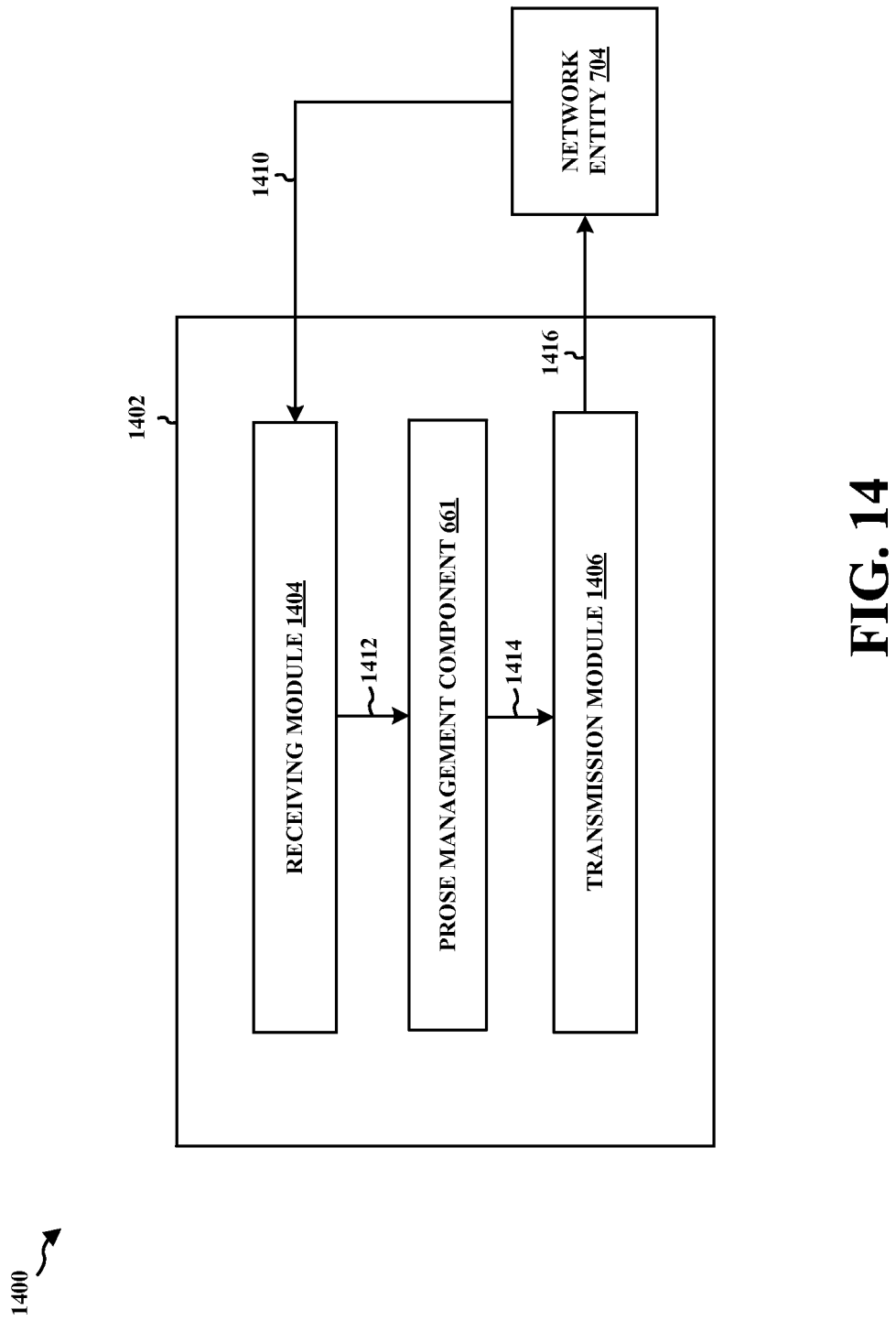
FIG. 14 is a conceptual data flow diagram illustrating the data flow between different modules/means/components in an exemplary apparatus.

FIG. 14 is a conceptual data flow diagram 1400 illustrating the data flow between different modules/means/components in an exemplary apparatus 1402. The apparatus 1402 may be a UE, such as UE 115 of FIG. 1, UE 206 of FIG. 2, UE 650 of FIG. 6, and/or UE 702 of FIG. 7. In addition, apparatus 1402 may be either of the first UE or the second UE as described in the present disclosure. The apparatus 1402 includes a receiving module 1404 that is configured to receive downlink data/messages 1410, which may include one or more polling response messages or proximity alerts. Such downlink data/messages 1410 may be transmitted to apparatus 1402, for example, by network entity 704, which may include, but is not limited to, access point 105 of FIG. 1, macro eNB 204 or low power class eNB 208 of FIG. 2, eNB 610 of FIG. 6, network entity 704 of FIG. 7, and/or apparatus 1002 of FIG. 10, any of which may include ProSe function component 602 (see, e.g., FIG. 8). For instance, receiving module 1404 may be configured to receive one or more polling response messages from one or more network entities 704. In an aspect, receiving module 1404 may receive the one or more polling response messages after apparatus 1402 transmits (e.g., via transmission module 1406) one or more corresponding polling messages. In some examples, each of the one or more polling response messages received by receiving module 1404 may include a next polling time for the apparatus 1402 that may be based on a location reporting schedule associated with apparatus 1402 and/or another apparatus, such as a second UE.

Once received, and in some examples, decoded or processed, the receiving module 1404 may send the received downlink data/messages 1412 to a ProSe management component 661 (see, e.g., FIG. 12), which may be included in apparatus 1402 along with the one or more subcomponents of ProSe management component 611 described in reference to FIG. 12. In an aspect, upon receiving each of the one or more polling response messages that may be included in the downlink data/messages 1412, the ProSe management component 661 may determine whether to transmit a polling message (or a "subsequent" polling message in relation to a previously transmitted polling message) to network entity 704 at a next polling time included in a particular received polling response message. Where the ProSe management component 661 determines that a polling message is to be transmitted to network entity 704, it may generate and send the polling message 1414 to transmission module 1406. In turn, the transmission module 1406 may be configured to transmit the polling message 1416 (which, again, may include a "subsequent" polling message in relation to a previously transmitted polling message) to network entity 704 at the next polling time included in the polling response message received at receiving module 1404. In addition, transmission module 1406 may be configured to transmit one or more proximity request messages, which may be generated by the ProSe management component 661, to network entity 704.

The apparatus may include additional modules that perform each of the steps of the algorithm in the aforementioned flow chart of FIG. 13. As such, each step in the aforementioned flow chart of FIG. 13 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 15:
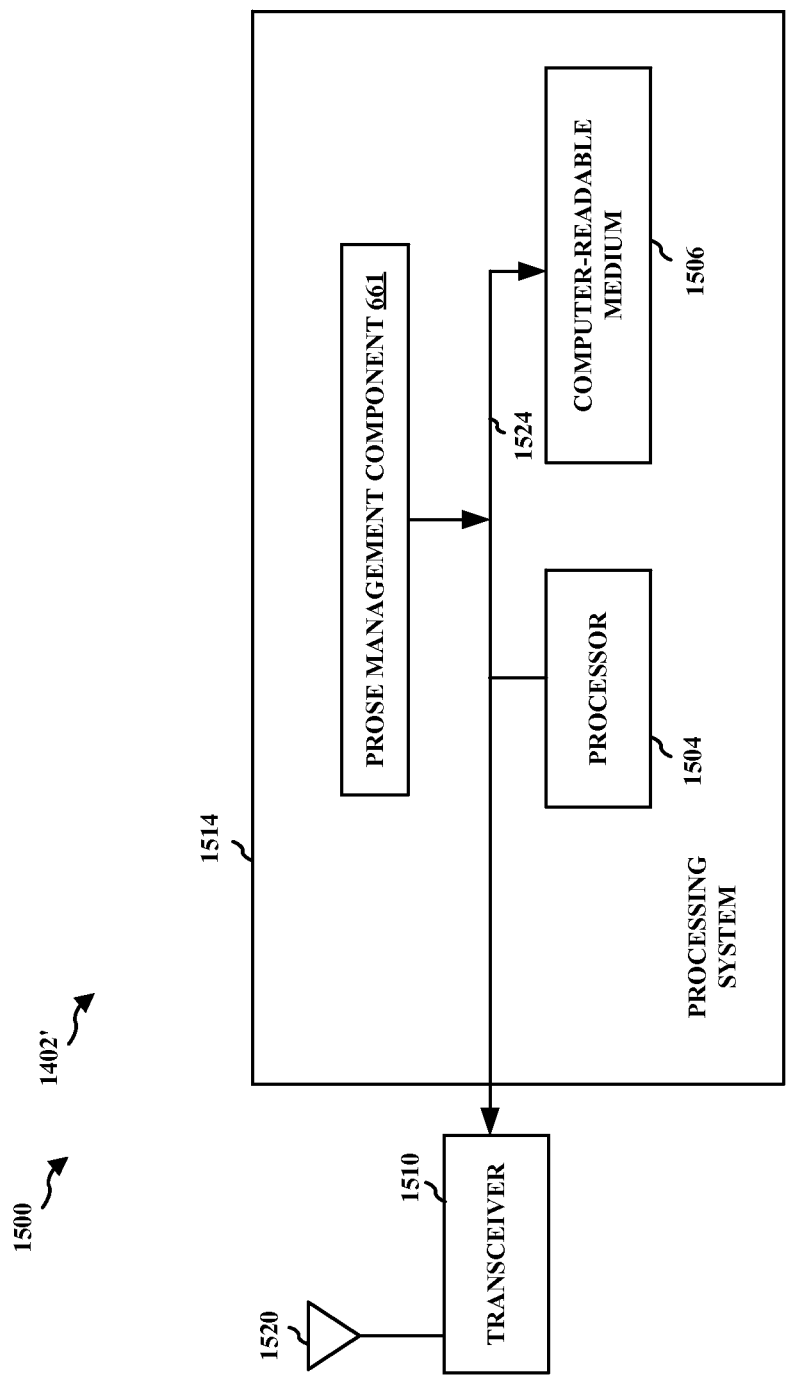
FIG. 15 is a diagram illustrating an example of a hardware implementation for an apparatus employing a processing system.

FIG. 15 is a diagram 1500 illustrating an example of a hardware implementation for an apparatus 1402' employing a processing system 1514. Like apparatus 1402, the apparatus 1402' may be a UE, such as UE 115 of FIG. 1, UE 206 of FIG. 2, UE 650 of FIG. 6, and/or UE 702 of FIG. 7, and may be the same apparatus as apparatus 1402 of FIG. 14. In addition, apparatus 1402' may be either of the first UE or the second UE as described in the present disclosure. The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors and/or hardware modules, represented by the processor 1504, the ProSe management component 661 and its related subcomponents (see, e.g., FIG. 12), and the computer-readable medium 1506. The bus 1524 may also link various other circuits such as timing sources, peripherals, voltage regulators, and power management circuits, which are well known in the art, and therefore, will not be described any further.

The processing system 1514 may be coupled to a transceiver 1510, which, in some examples, may include receiving module 1404 and/or transmission module 1406 of FIG. 14. The transceiver 1510 is coupled to one or more antennas 1520. The transceiver 1510 provides a means for communicating with various other apparatus (which may include, but are not limited to, access point 105 of FIG. 1, macro eNB 204 or low power class eNB 208 of FIG. 2, eNB 610 of FIG. 6, network entity 704 of FIG. 7 or 14, and/or apparatus 1402 of FIG. 14, any of which may include a ProSe function component 602 of FIG. 8) over a transmission medium. In addition, the transceiver 1510 may be configured to transmit uplink data/messages (proximity request messages, polling messages, etc.) to one or more UEs and may potentially include transmission module 1406 of FIG. 14. The processing system 1514 includes a processor 1504 coupled to a computer-readable medium 1506. The processor 1504 is responsible for general processing, including the execution of software stored on the computer-readable medium 1506. The software, when executed by the processor 1504, causes the processing system 1514 to perform the various functions described supra for any particular apparatus. The computer-readable medium 1506 may also be used for storing data that is manipulated by the processor 1504 when executing software. The processing system further includes ProSe management component 661 and its related subcomponents (see, e.g., FIG. 12). The modules/components may be software modules running in the processor 1504, resident/stored in the computer-readable medium 1506, one or more hardware modules coupled to the processor 1504, or some combination thereof. The processing system 1514 may be a component of the eNB 610 and may include the memory 676 and/or at least one of the TX processor 616, the RX processor 670, and the controller/processor 675.

In one configuration, the apparatus 1402' for wireless communication includes means for transmitting, by a first UE, a polling message to a network entity; means for receiving, at the first UE and after transmitting the polling message, a polling response message that includes a next polling time for the first UE that is based on a location reporting schedule associated with one or both of the first UE and a second UE; and means for determining whether to transmit a subsequent polling message to the network entity at the next polling time included in the polling response message.

The aforementioned means may be one or more of the aforementioned modules of the apparatus 1402 and/or the processing system 1514 of the apparatus 1402' configured to perform the functions recited by the aforementioned means. As described supra, the processing system 1514 may include the TX Processor 616, the RX Processor 670, and the controller/processor 675. As such, in one configuration, the aforementioned means may be the TX Processor 616, the RX Processor 670, and the controller/processor 675 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of polling management in a proximity services (ProSe) system, comprising:
   receiving, at a network entity, a polling message from a first user equipment (UE);
   receiving, at the network entity and after receiving the polling message, one or both of a first location report associated with the first UE and a second location report associated with a second UE;
   determining, at the network entity, whether to generate a polling response message upon receiving one or both of the first location report and the second location report, wherein the polling response message includes a next polling time for the first UE that is based on a location reporting schedule associated with one or both of the first UE and the second UE; and
   transmitting the polling response message to the first UE.

2. The method of claim 1, further comprising closing a Hypertext Transfer Protocol (HTTP) connection between the network entity and the first UE upon transmitting the polling response message.

3. The method of claim 1, wherein determining whether to generate the polling response message comprises:
   determining to generate the polling response message where neither of a Proximity Alert or a Cancel Proximity Request is generated based on one or both of the first location report and the second location report.

4. The method of claim 1, further comprising receiving, at the network entity and prior to receiving the polling message, a proximity request procedure initiation message from the first UE, wherein the proximity request procedure initiation message causes the generating of the polling response message to be triggered based on receiving one or both of the first location report and the second location report.

5. The method of claim 1, further comprising:
   calculating a probability that the second UE will be in proximity to the first UE within a time period; and
   determining the next polling time for the first UE based on the probability.

6. The method of claim 5, wherein the probability is calculated based on one or more movement trends derived from two or more location reports.

7. The method of claim 5, wherein determining whether to generate the polling response message comprises:
   generating the polling response message based on the probability.

8. An apparatus for polling management in a proximity services (ProSe) system, comprising:
   means for receiving, at a network entity, a polling message from a first user equipment (UE);
   means for receiving, at the network entity and after receiving the polling message, one or both of a first location report associated with the first UE and a second location report associated with a second UE;
   means for determining, at the network entity, whether to generate a polling response message upon receiving one or both of the first location report and the second location report, wherein the polling response message includes a next polling time for the first UE that is based on a location reporting schedule associated with one or both of the first UE and the second UE; and
   means for transmitting the polling response message to the first UE.

9. The apparatus of claim 8, further comprising means for closing a Hypertext Transfer Protocol (HTTP) connection between the network entity and the first UE upon transmitting the polling response message.

10. The apparatus of claim 8, wherein means for transmitting the polling response message to the first UE further comprises:
    means for determining to generate the polling response message where neither of a Proximity Alert or a Cancel Proximity Request is generated based on one or both of the first location report and the second location report.

11. The apparatus of claim 8, further comprising means for receiving, at the network entity and prior to receiving the polling message, a proximity request procedure initiation message from the first UE, wherein the proximity request procedure initiation message causes the generating of the polling response message to be triggered based on the receiving of one or both of the first location report and the second location report.

12. The apparatus of claim 8, further comprising:
    means for calculating a probability that the second UE will be in proximity to the first UE within a time period; and
    means for determining the next polling time for the first UE based on the probability.

13. The apparatus of claim 12, wherein the means for calculating the probability is configured to calculate the probability based on one or more movement trends derived from two or more location reports.

14. The apparatus of claim 12, wherein means for determining whether to generate the polling response message comprises:
    means for generating the polling response message based on the probability.

15. A non-transitory computer-readable medium storing computer-executable code for polling management in a proximity services (ProSe) system, the computer-executable code comprising:
    code for receiving, at a network entity, a polling message from a first user equipment (UE);
    code for receiving, at the network entity and after receiving the polling message, one or both of a first location report associated with the first UE and a second location report associated with a second UE;
    code for determining, at the network entity, whether to generate a polling response message upon receiving one or both of the first location report and the second location report, wherein the polling response message includes a next polling time for the first UE that is based on a location reporting schedule associated with one or both of the first UE and the second UE; and
    code for transmitting the polling response message to the first UE.

16. The computer-readable medium of claim 15, wherein the computer-executable code further comprises code for closing a Hypertext Transfer Protocol (HTTP) connection between the network entity and the first UE upon transmitting the polling response message.

17. The computer-readable medium of claim 15, wherein the computer-executable code for determining whether to generate the polling response message comprises:
    code for determining to generate the polling response message where neither of a Proximity Alert or a Cancel Proximity Request is generated based on one or both of the first location report and the second location report.

18. The computer-readable medium of claim 15, wherein the computer-executable code further comprises code for receiving, at the network entity and prior to receiving the polling message, a proximity request procedure initiation message from the first UE, wherein the proximity request procedure initiation message causes the generating of the polling response message to be triggered based on the receiving of one or both of the first location report and the second location report.

19. The computer-readable medium of claim 15, wherein the computer-executable code further comprises:
    code for calculating a probability that the second UE will be in proximity to the first UE within a time period; and
    code for determining the next polling time for the first UE based on the probability.

20. The computer-readable medium of claim 19, wherein the code for calculating the probability comprises code for calculating the probability based on one or more movement trends derived from two or more location reports.

21. The computer-readable medium of claim 19, wherein the computer-executable code for determining whether to generate the polling response message comprises:
    code for generating the polling response message based on the probability.

22. A method of polling in a proximity services (ProSe) system, comprising:
    transmitting, by a first UE, a polling message to a network entity;
    receiving, at the first UE and after transmitting the polling message, a polling response message that includes a next polling time for the first UE that is based on a location reporting schedule associated with one or both of the first UE and a second UE;
    determining, at the first UE, whether to transmit a subsequent polling message to the network entity at the next polling time included in the polling response message and;
    transmitting the subsequent polling message to the network entity based on the determining.

23. The method of claim 22, wherein the subsequent polling message is transmitted to the network entity at the next polling time included in the polling response message.

24. The method of claim 22, further comprising transmitting a position estimate to a Secure User Plane Location (SUPL) Location Platform (SLP) that is configured to generate a location reporting message based on the position estimate, wherein the location reporting message is transmitted to the network entity via the SLP after the first UE transmits the polling message.

25. The method of claim 22, further comprising transmitting a location measurement to a Secure User Plane Location (SUPL) Location Platform (SLP) that is configured to generate a location estimate for the first UE based on the location measurement and is configured to generate a location reporting message that includes the location estimate, wherein the location reporting message is transmitted to the network entity via the SLP after the first UE transmits the polling message.

26. The method of claim 22, wherein determining whether to transmit the subsequent polling message at the next polling time comprises determining to not transmit the subsequent polling message at the next polling time, and further comprising transmitting the subsequent polling message at a time other than the next polling time included in the polling response message.

27. The method of claim 22, wherein transmitting the subsequent polling message to the network entity comprises transmitting the polling message only if the first UE has previously initiated a proximity request procedure or has been requested by the network entity to initiate periodic location reporting.

* * * * *